United States Patent
Tamura et al.

[11] Patent Number: 5,841,558
[45] Date of Patent: Nov. 24, 1998

[54] AUXILIARY-SIGNAL TRANSMISSION SYSTEM

[75] Inventors: Yuji Tamura; Hiroyuki Itou; Tsukasa Takahashi, all of Sapporo; Michikazu Shima, Kawasaki; Yumiko Kawasaki, Kawasaki; Kazuo Yamane, Kawasaki, all of Japan

[73] Assignee: Fujitsu Limited, Kanagawa, Japan

[21] Appl. No.: 787,391

[22] Filed: Jan. 22, 1997

Related U.S. Application Data

[62] Division of Ser. No. 388,357, Feb. 14, 1995, Pat. No. 5,625,481.

[30] Foreign Application Priority Data

Jun. 21, 1994 [JP] Japan ................................. 6-138479

[51] Int. Cl.⁶ .................................................. H04B 10/16
[52] U.S. Cl. ........................ 359/124; 359/179; 359/177; 359/341
[58] Field of Search .................................. 359/110, 174, 359/175, 176, 177, 179, 160, 333, 341, 124

[56] References Cited

U.S. PATENT DOCUMENTS

| | | | |
|---|---|---|---|
| 5,175,641 | 12/1992 | Boerstler et al. . | |
| 5,309,268 | 5/1994 | Nakamura et al. | 359/154 |
| 5,383,046 | 1/1995 | Tomofugi et al. | 359/179 |
| 5,394,265 | 2/1995 | Nagel et al. | 359/341 |
| 5,442,479 | 8/1995 | Bülow et al. | 359/341 |
| 5,506,724 | 4/1996 | Shimizu et al. . | |
| 5,598,289 | 1/1997 | Watanabe | 359/179 |
| 5,625,481 | 4/1997 | Tamura et al. | 359/179 |

FOREIGN PATENT DOCUMENTS

| | | |
|---|---|---|
| 4 331 514 | 11/1992 | Japan . |
| 6 284 092 | 10/1994 | Japan . |
| 2 245 121 | 12/1991 | United Kingdom . |

Primary Examiner—Rafael Bacares
Attorney, Agent, or Firm—Helfgott & Karas, P.C.

[57] ABSTRACT

Spontaneous emission occurring in association with direct optical amplification using an erbium-doped optical fiber is modulated with an auxiliary signal, such as a supervisory signal, for transmission of the auxiliary signal. In a first aspect of the invention, the output of an optical amplifier is passed through a variable optical band-pass filter whose transmission characteristic is varied in accordance with the auxiliary signal, to modulate the spontaneous emission component contained in the optical amplifier output. In a second aspect of the invention, the output of the optical amplifier is separated by an optical branching device into a main optical signal and part of the spontaneous emission. The separated spontaneous emission component is modulated by being passed through a variable optical band-pass filter whose transmission characteristic is varied in accordance with the auxiliary signal, and then, the modulated spontaneous emission component is wavelength-division multiplexed with the main optical signal.

15 Claims, 28 Drawing Sheets

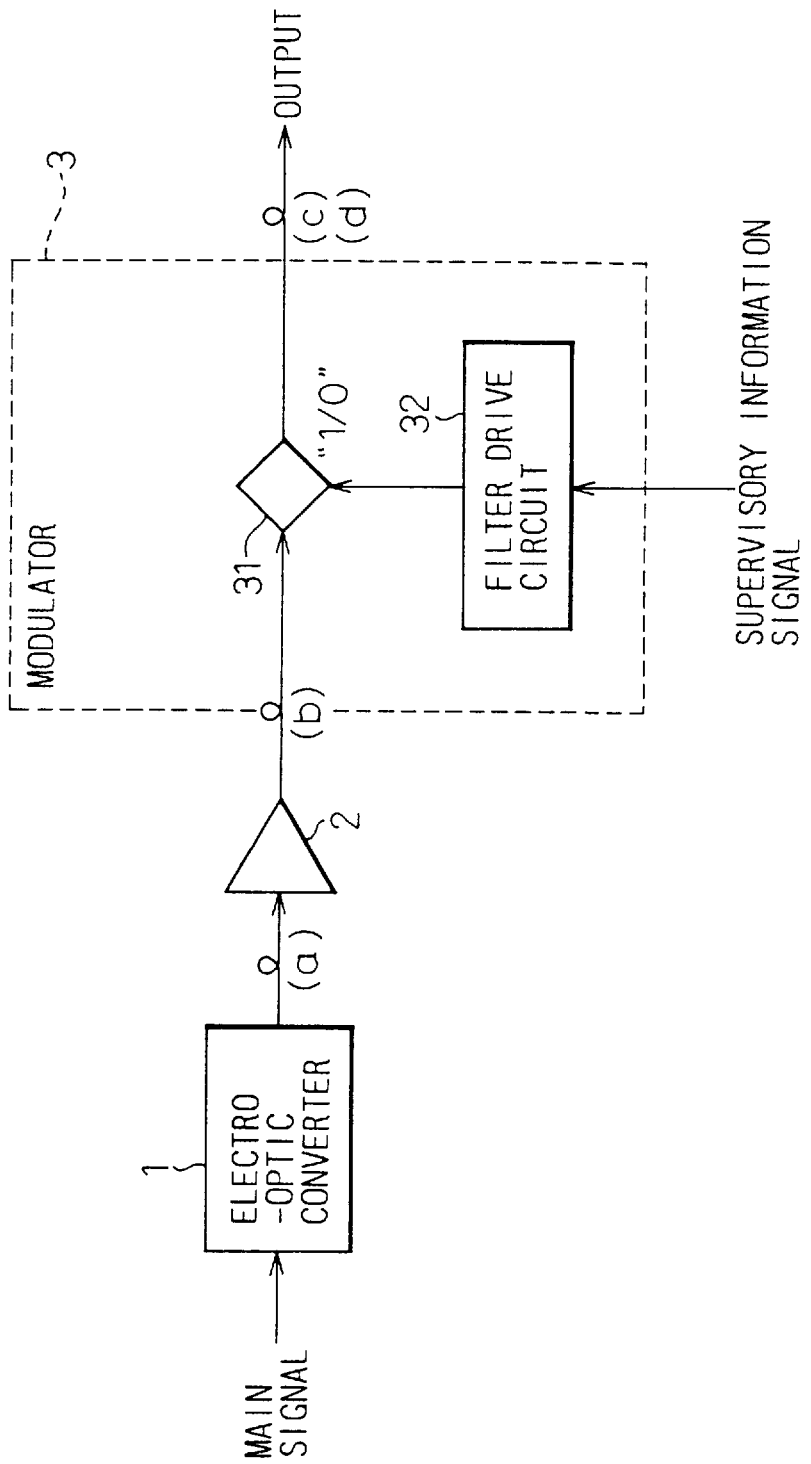

"1"  ⎫
                                 ⎬ OUTPUT LIGHT
  "0"  ⎭

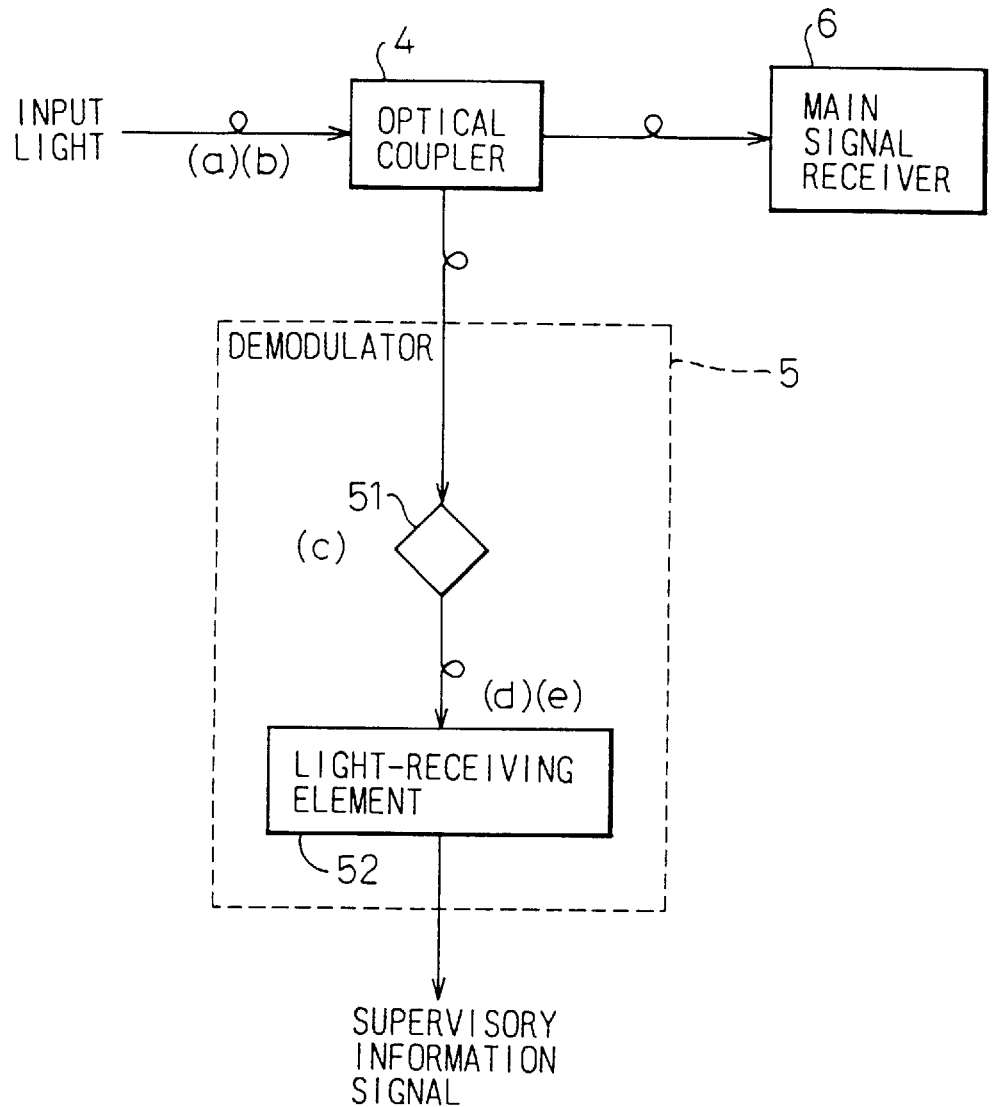

"0"

"1"

"1"

"0"

} OUTPUT LIGHT

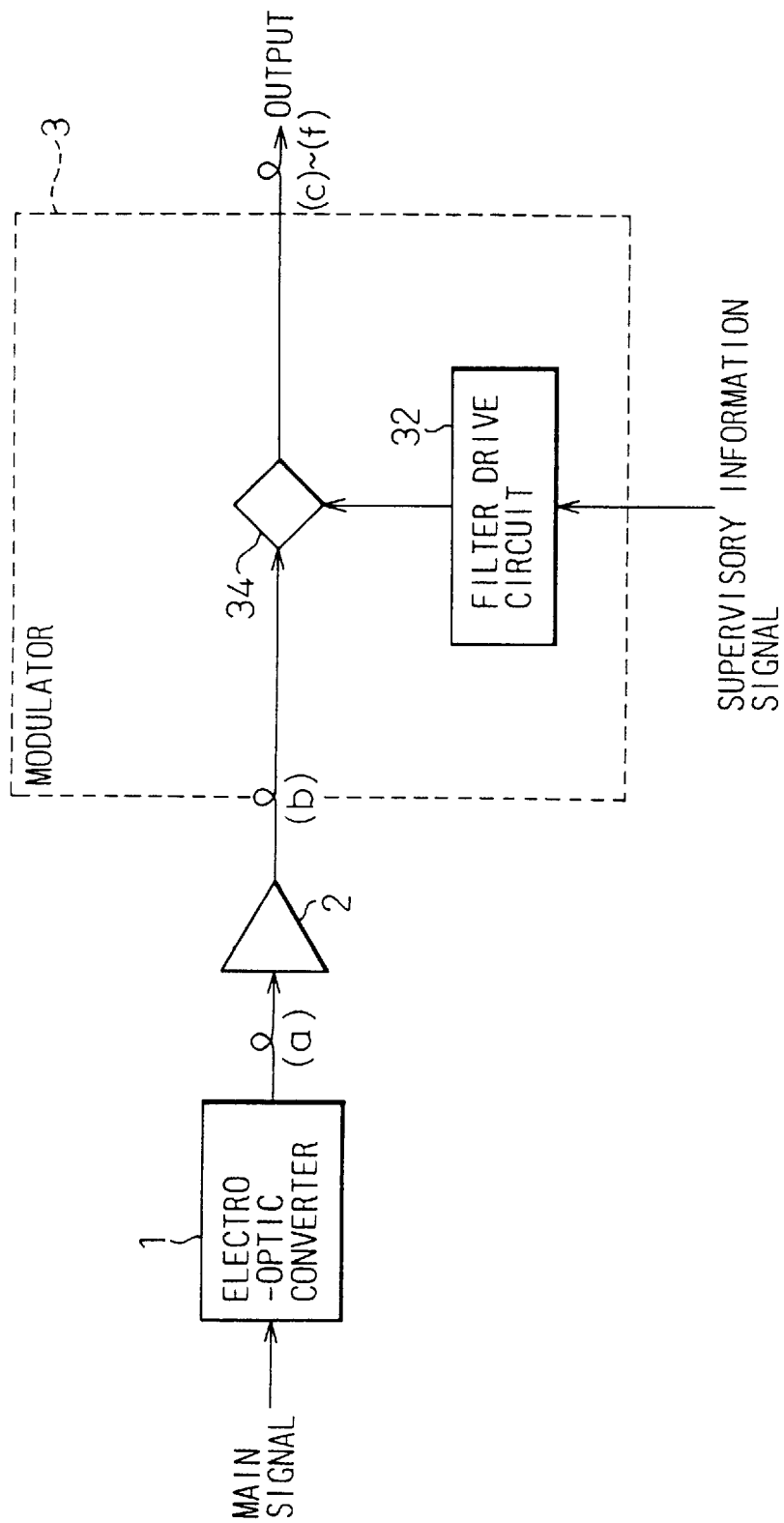

"00"

"01"

"10"

"11"

} OUTPUT LIGHT

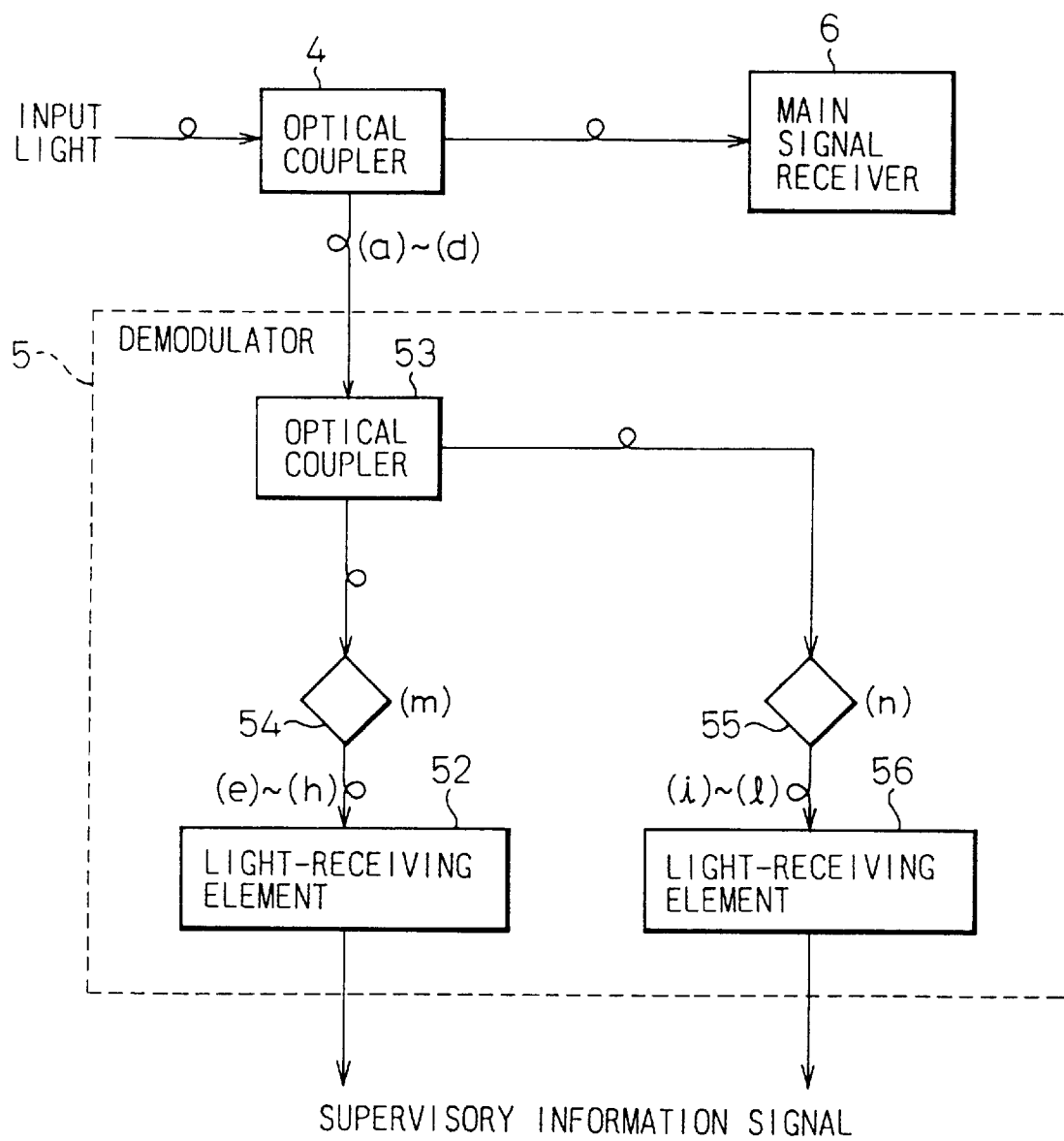

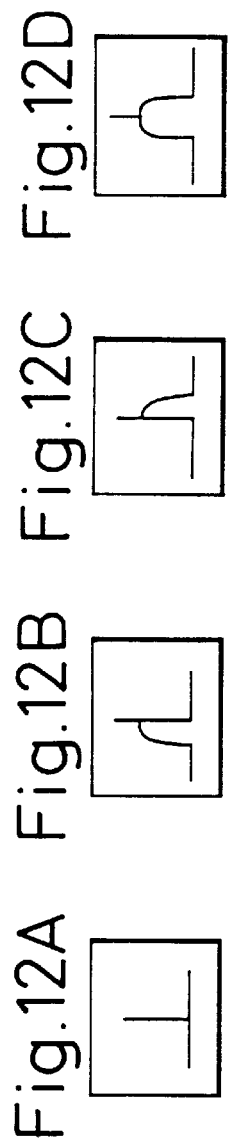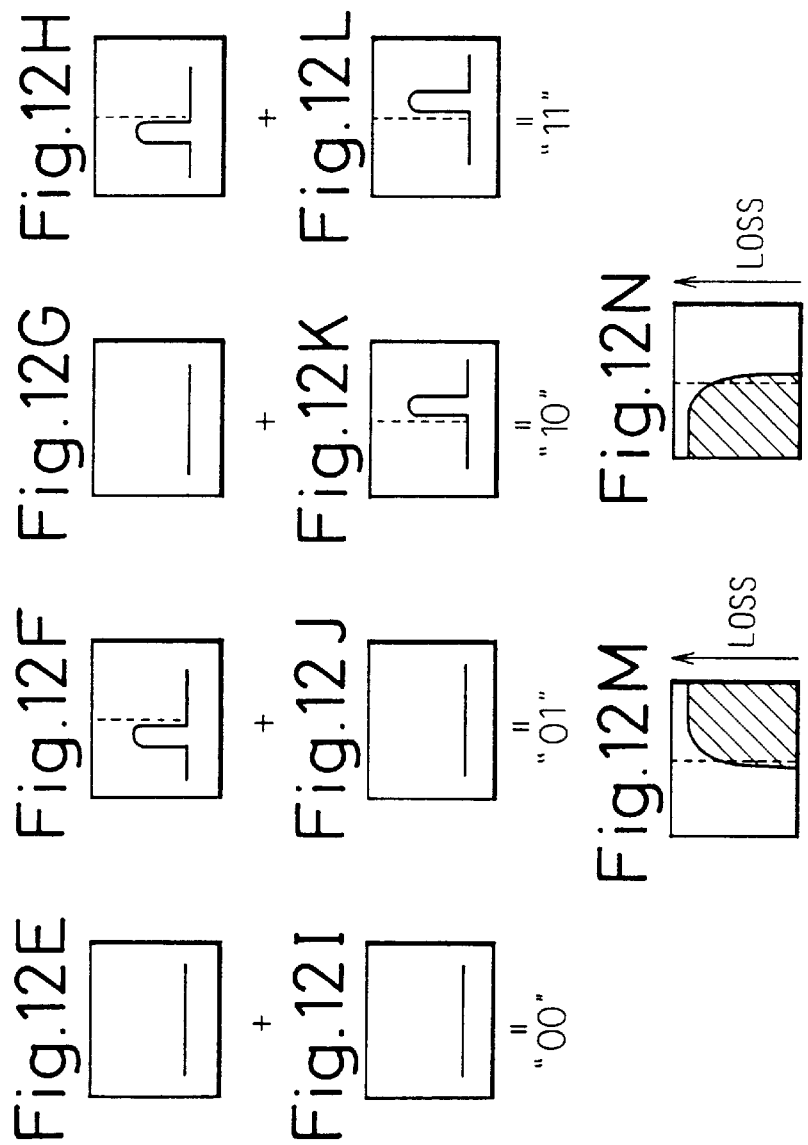

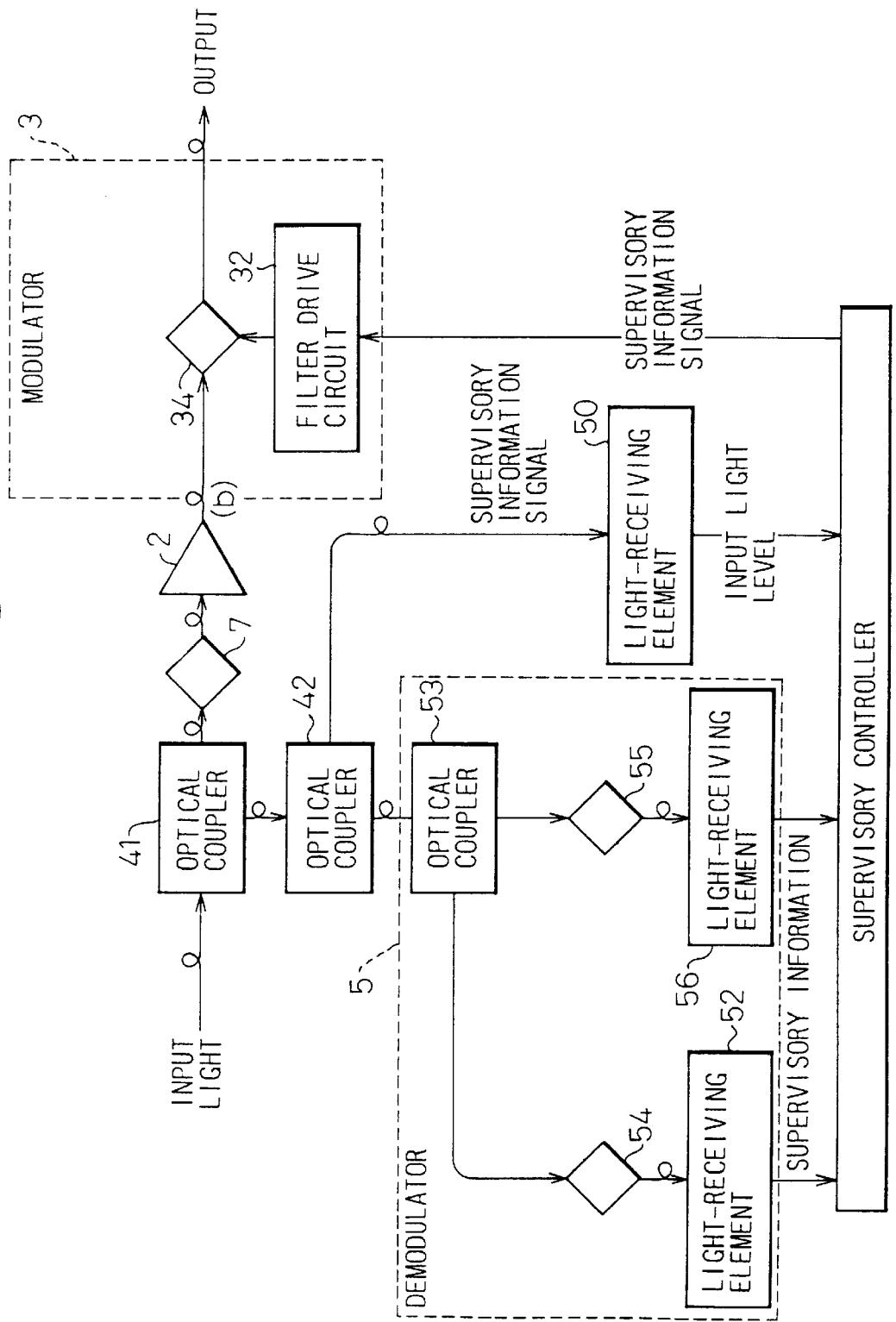

Fig.15A
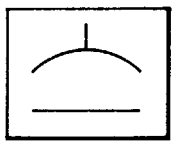
Fig.15B    Fig.15C
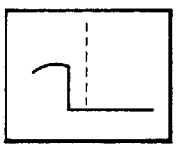    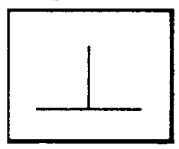
Fig.15D    Fig.15E
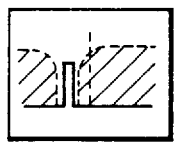    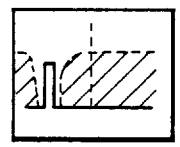
"0"    "1"
Fig.15F    Fig.15G
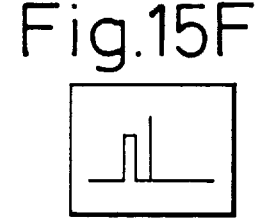    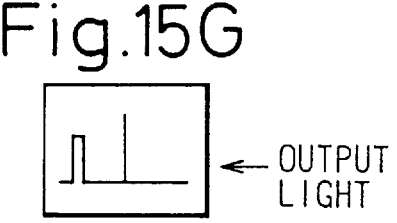 ← OUTPUT LIGHT Fig.20A
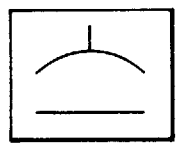
Fig.20B      Fig.20C
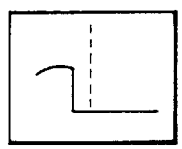 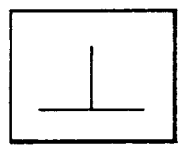
Fig.20D      Fig.20E
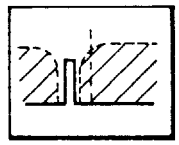 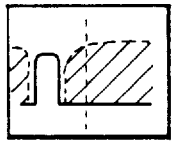
"0"            "1"
Fig.20F      Fig.20G
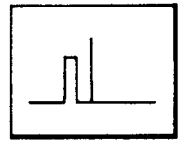 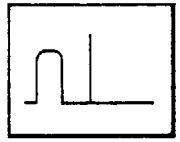 OUTPUT LIGHT

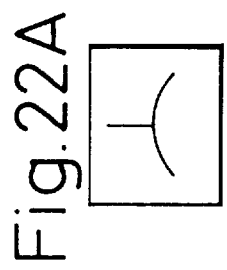
Fig.22A
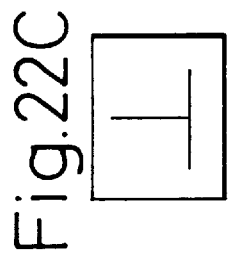
Fig.22B
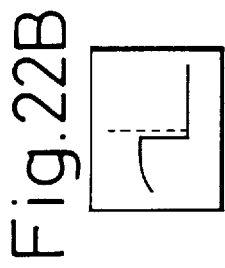
Fig.22D "00"
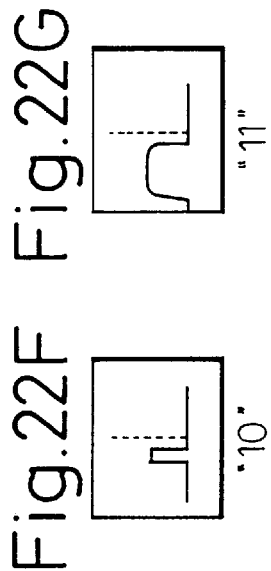
Fig.22C, Fig.22F "10", Fig.22E "01"
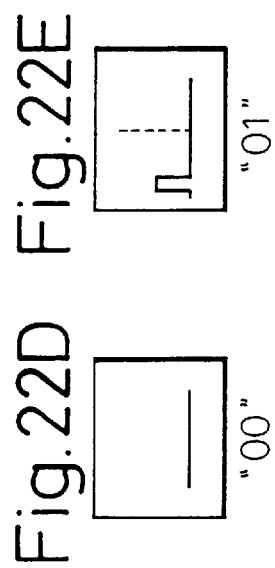
Fig.22G "11"
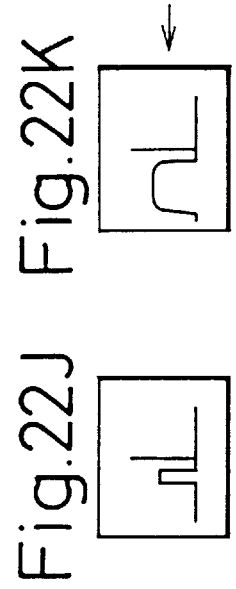
Fig.22K, Fig.22J, Fig.22I
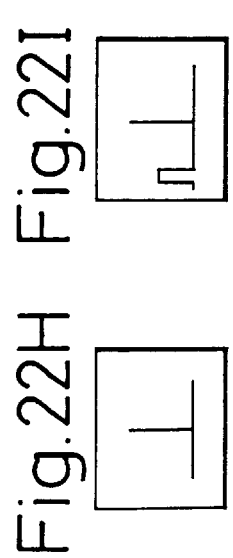
Fig.22H
OUTPUT LIGHT

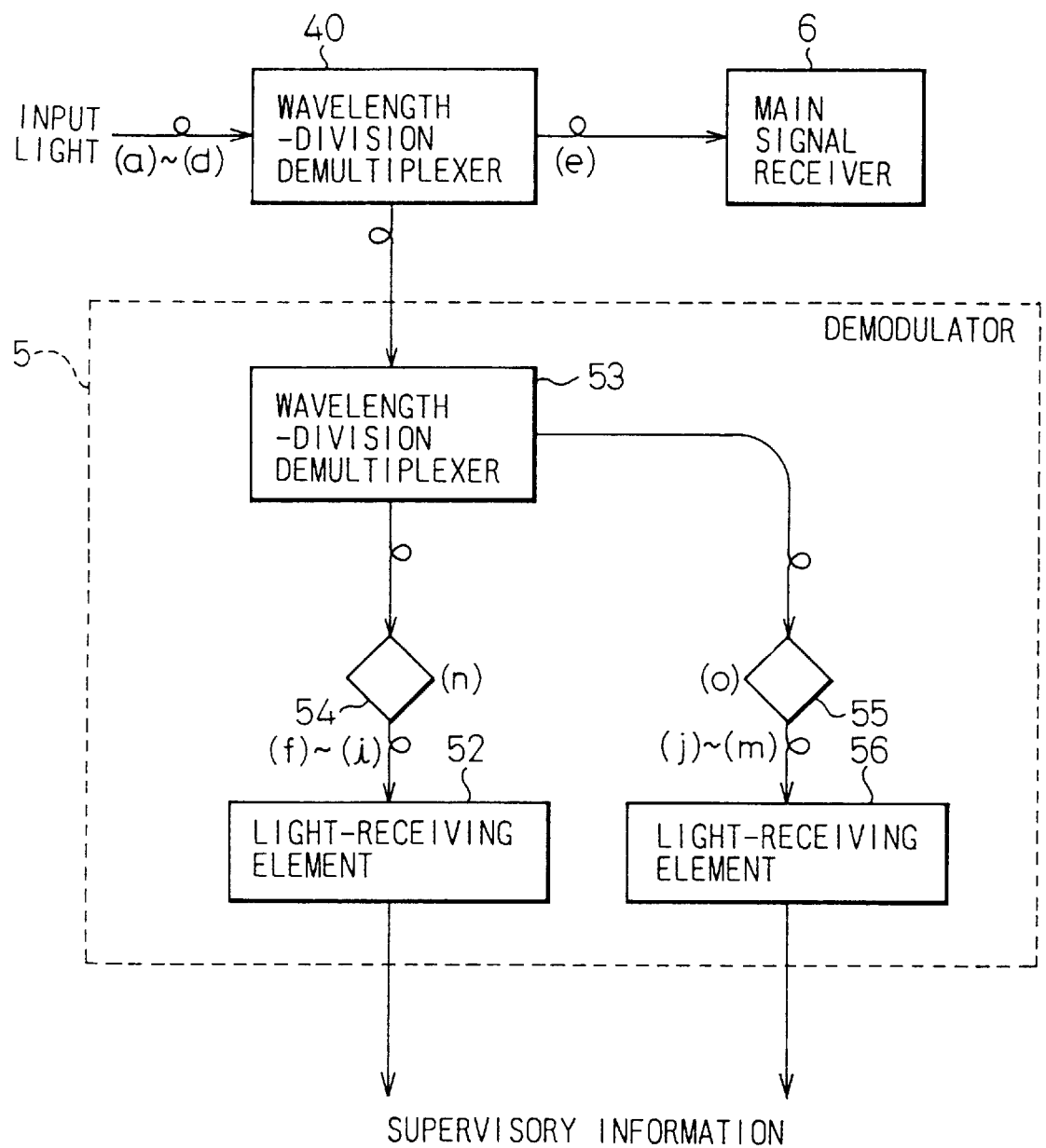

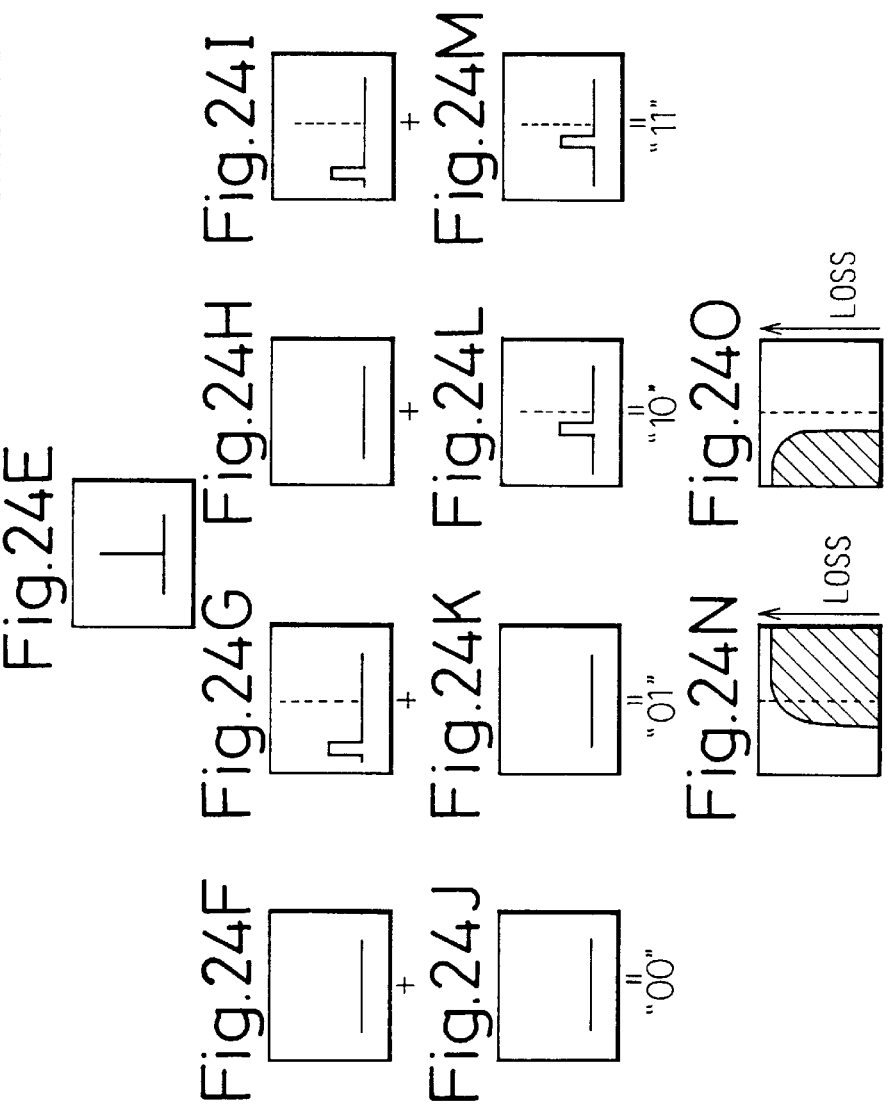

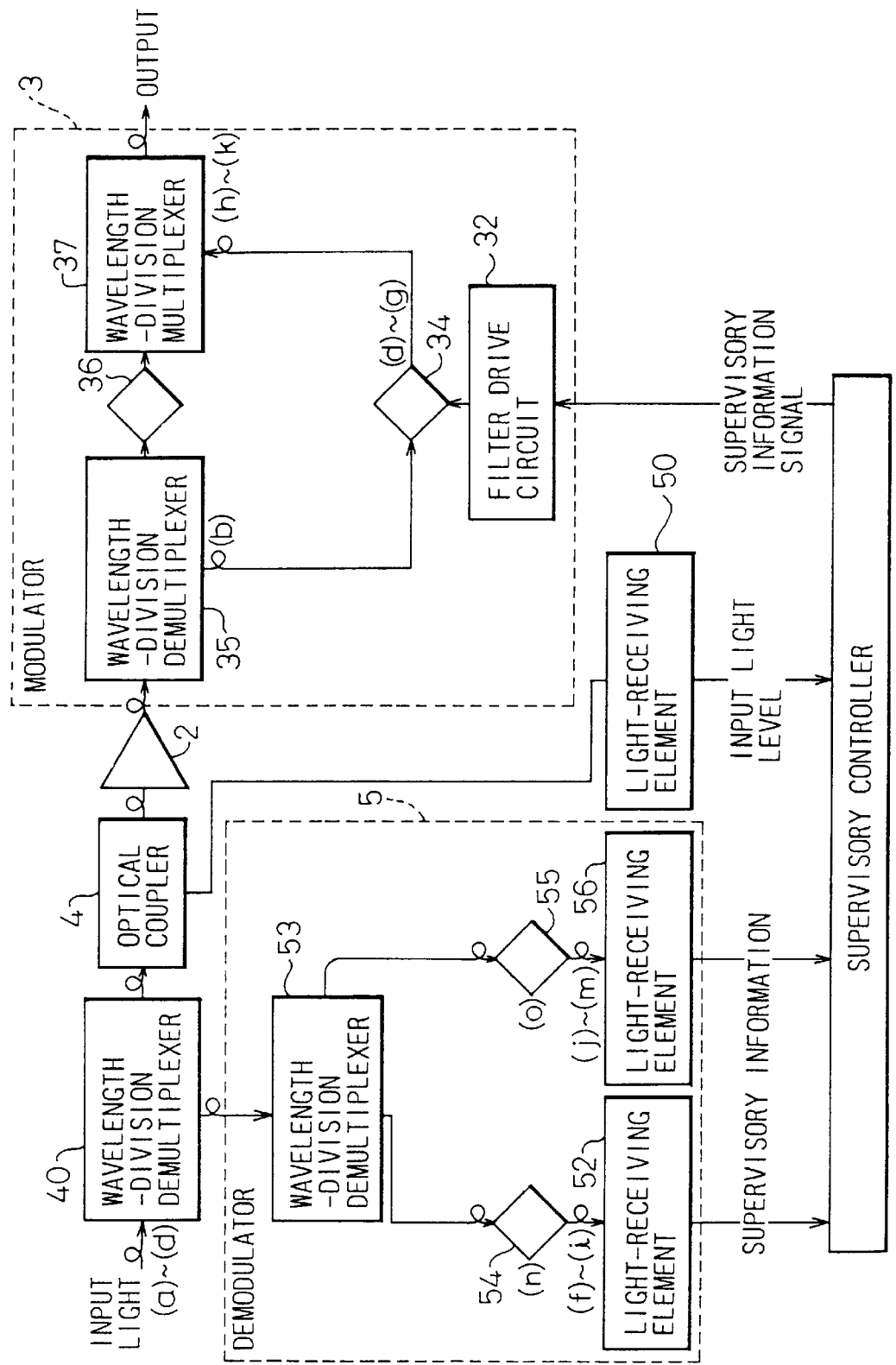

Fig.27A
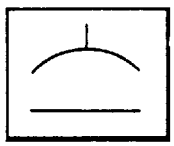
Fig.27B  Fig.27C
 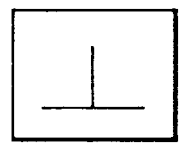
Fig.27D  Fig.27E
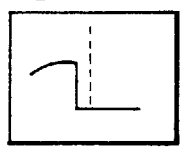 
"0"    "1"
Fig.27F  Fig.27G
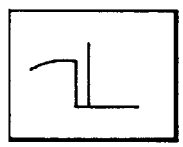 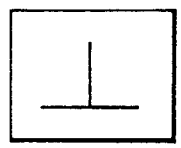 ← OUTPUT LIGHT

"1"       "0"

AUXILIARY-SIGNAL TRANSMISSION SYSTEM

This is a division of application Ser. No. 08/388,357, filed Feb. 14, 1995, 5,625,481.

BACKGROUND OF THE INVENTION

1. Field of the Invention.

The present invention relates to an optical transmission system, and more particularly to an optical transmission system in which a main signal and an auxiliary signal such as a supervisory information signal are transmitted together from an optical transmitter to an optical receiver, with or without the intervention of an optical repeater, each being equipped with an optical amplifier that directly amplifies the optical signal.

2. Description of the Related Art

In the transmission of an optical signal, an auxiliary signal such as a supervisory information signal is transmitted, together with the main signal, from an optical transmitter (hereinafter referred to as the transmitting terminal) and the auxiliary signal thus transmitted is detected by an optical receiver (hereinafter referred to as the receiving terminal). When the transmitting and receiving terminals are separated by a long distance, an optical repeater installed between them extracts the auxiliary signal, and optically amplifies the main signal using an optical amplifier in the optical repeater. The amplified main signal is then transmitted, by the optical repeater, together with its response information corresponding to the supervisory information signal as an auxiliary signal. The reliability of the whole system is thus enhanced.

The following methods have been proposed in the prior art for the transmission of a supervisory information signal from an optical transmitter to an optical receiver, with or without the intervention of an optical repeater, each incorporating an optical amplifier.

i) A method in which the supervisory information signal is superimposed on the main signal, thereby transmitting the main signal together with the supervisory information signal using light of a single wavelength.

ii) A method in which supervisory information signal light of a wavelength different from that of the main signal light is wavelength-division multiplexed with the main signal light using a wavelength-division multiplexer, and at the receiving terminal, the signals are demultiplexed by a wavelength-division demultiplexer to detect the supervisory information signal/response signal.

An optical amplifier is constructed using an optical fiber doped with a rare earth element such as erbium, and is provided at its input side with an optical branching device for monitoring the condition of an input optical signal and at its output side with an optical band-pass filter for blocking the spontaneous emission light occurring within the optical fiber.

When amplifying input light in the transmitting terminal, receiving terminal, and/or optical repeater, the optical amplifier, because of its properties, amplifies not only the main signal component but also the signal components on both sides of the main component that occur due to spontaneous emission. The above methods i) and ii), therefore, have the following problems.

(1) Problems with the method involving superimposing the supervisory information signal on the main signal light.

i) With the superimposition of the supervisory information signal, the main signal light is in effect amplitude-modulated, which increases noise components and thus decreases the reception sensitivity of the receiving terminal.

ii) Amplitude modulation makes it difficult to stabilize optical repeater output.

(2) Problems with the method involving wavelength-division multiplexing of main signal light and supervisory information signal light for transmission.

i) A light-emitting device for emitting special wavelength light is needed at the transmitting side for the transmission of the supervisory information signal.

ii) When transmitting different main signal light beams by wavelength-division multiplexing, associated supervisory information signal light beams must also be multiplexed; this limits the number of main signal light beams which can be multiplexed together.

SUMMARY OF THE INVENTION

It is accordingly an object of the present invention to provide an optical transmission system that achieves the transmission of a supervisory information signal simultaneously with a main signal without using signal multiplexing or wavelength-division multiplexing as mentioned above in an optical transmitter, an optical receiver, and/or an optical repeater, each being equipped with an optical amplifier that directly amplifies optical signals.

According to the present invention, there is provided an optical transmission apparatus comprising: an optical amplifier for amplifying an input main optical signal and outputting a first optical signal containing an amplified main optical signal and spontaneously emitted light; and modulating means for modulating the spontaneously emitted light contained in the first optical signal in accordance with an auxiliary signal, to output a second optical signal containing the amplified main optical signal and an auxiliary optical signal.

According to the present invention, there is also provided an optical receiving apparatus comprising: an optical branching device for separating an optical signal, containing a main optical signal and spontaneously emitted light modulated with an auxiliary signal, into a first optical signal containing the main optical signal and a second optical signal containing the modulated spontaneously emitted light; and demodulating means for performing demodulation to recover the auxiliary signal from the second optical signal.

According to the present invention, there is also provided an optical repeater comprising: means for demodulating spontaneously emitted light that was modulated with an auxiliary signal contained in a received optical signal, and thereby recovering the auxiliary signal; an optical amplifier for amplifying a main optical signal contained in the received optical signal and thereby outputting a first optical signal containing an amplified main optical signal and spontaneously emitted light; and modulating means for modulating the spontaneously emitted light contained in the first optical signal in accordance with the auxiliary signal, and outputting a second optical signal containing the amplified main optical signal and an auxiliary optical signal.

BRIEF DESCRIPTION OF THE DRAWINGS

FIG. 1 and FIGS. 2A to 2D are diagrams showing a first embodiment of a transmitting terminal used in the optical transmission system of the present invention;

FIG. 3 and FIGS. 4A to 4E are diagrams showing a first embodiment of a receiving terminal used in the optical transmission system of the present invention;

FIG. 8 and FIGS. 9A to 9F are diagrams showing a third embodiment of the transmitting terminal used in the optical transmission system of the present invention;

FIG. 11 and FIGS. 12A to 12N are diagrams showing a second embodiment of the receiving terminal used in the optical transmission system of the present invention;

FIG. 13 is a diagram showing a second embodiment of the optical repeater used in the optical transmission system of the present invention;

FIG. 14 and FIGS. 15A to 15G are diagrams showing a fourth embodiment of the transmitting terminal used in the optical transmission system of the present invention;

FIG. 19 and FIGS. 20A to 20G are diagrams showing a fifth embodiment of the transmitting terminal used in the optical transmission system of the present invention;

FIG. 21 and FIGS. 22A to 22K are diagrams showing a sixth embodiment of the transmitting terminal used in the optical transmission system of the present invention;

FIG. 23 and FIGS. 24A to 24O are diagrams showing a fourth embodiment of the receiving terminal used in the optical transmission system of the present invention;

FIG. 25 is a diagram showing a fourth embodiment of the optical repeater used in the optical transmission system of the present invention;

FIG. 26 and FIGS. 27A to 27G are diagrams showing a seventh embodiment of the transmitting terminal used in the optical transmission system of the present invention.

DESCRIPTION OF THE PREFERRED EMBODIMENTS

Figure 2C:
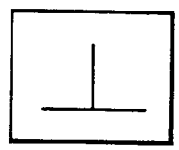
Figure 2D:
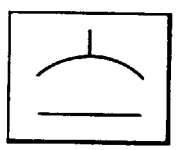

FIG. 1 shows a first embodiment of a transmitting terminal as an optical transmission apparatus used in the optical transmission system of the present invention. In the figure, numeral 1 designates an electro-optic converter for converting the main signal in electric form into optical form, 2 indicates an optical amplifier, including an optical fiber doped with a rare earth element such as erbium, for directly amplifying the main signal light, i.e., the output signal light of the converter 1, and 3 represents a modulator for modulating spontaneously emitted light contained in the output signal light of the optical amplifier 2 in accordance with a supervisory information signal, and for transmitting the modulated signal out onto an optical transmission line. In this embodiment, the modulator 3 comprises a variable-wavelength optical band-pass filter (BPF) 31 whose pass band is varied by a control signal, and a filter drive circuit 32 for driving the filter 31 in accordance with the supervisory information signal.

The operation of the transmitting terminal will be described below with reference to the optical spectrum diagrams shown in FIGS. 2A to 2D. FIGS. 2A to 2D respectively show optical spectra of the portions designated by corresponding reference signs (a) to (d) in FIG. 1 (the same applies throughout the figures given hereinafter).

First, after the electrical main signal is converted into optical form by the converter 1, the main signal light ((a); FIG. 2A) is amplified by the optical amplifier 2 with a gain sufficient to compensate for the transmission loss to the next optical repeater (not shown). The amplified main signal light ((b); FIG. 2B) is passed through the modulator 3 and is transmitted through a transmitting optical fiber. In the modulator 3, the supervisory information signal is input to the filter drive circuit 32, and the pass band wavelength is varied in accordance with the supervisory information signal, thus performing wavelength modulation. More specifically, the variable-wavelength optical band-pass filter 31 has a transmission wavelength range wider by an appropriate amount than the wavelength range of the main signal light (a), (b), the transmission wavelength range being displaceable by a given wavelength width to one or other side of the main signal light wavelength; the result is modulated light (c) or (d) (FIG. 2C, FIG. 2D) having a given spectral width with part of the spontaneous emission component produced within the optical amplifier 2 added to the main signal light at the shorter wavelength or longer wavelength side thereof. The supervisory information signal is a digital signal represented by "1" and "0"; for example, when the state in which the shorter-wavelength light is added to the main signal light is represented by "1", and the state in which the longer-wavelength light is added to it is represented by "0", then the supervisory information signal is converted into wavelength spectrum signal light (c) or (d), respectively, which is transmitted over a transmitting optical fiber.

FIG. 3 shows a first embodiment of a receiving terminal as an optical receiving apparatus used in the optical transmission system of the present invention. In the figure, numeral 1 designates an optical coupler for splitting input light power from the optical transmission line into two outputs, 5 indicates a demodulator for demodulating one output light of the optical coupler 4, to recover the supervisory information signal, and 6 denotes a main signal receiver for receiving the main signal from the other output light of the optical coupler 4. The demodulator 5 comprises an optical filter 51 that transmits only part of the one output light entering from the optical coupler 4, and a light-receiving element 52 for converting the output light of the optical filter 51 into an electrical supervisory information signal.

The operation of the receiving terminal will be described below with reference to FIGS. 4A to 4E. FIGS. 4A, 4B, 4D, and 4E respectively show optical spectra of the portions designated by corresponding reference signs (a), (b), (d), and (e) in FIG. 3, and FIG. 4C shows the characteristic of the optical filter 51.

The signal light, (a) or (b) (FIG. 4A or 4B), input to the receiving terminal is split by the optical coupler 4, one output light being directed to the main signal receiver 6. The other signal light output from it is fed into the demodulator 5 where the optical filter 51, by its characteristic, blocks wavelengths containing the main signal light wavelength and transmits only the signal light components on the longer wavelength or shorter wavelength side of the main signal light wavelength. The transmitted optical signal is then converted into electrical form by the light-receiving element 52.

Figure 4A:
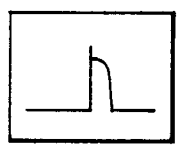
Figure 4B:
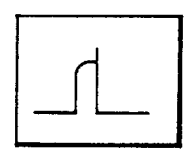
Figure 4C:
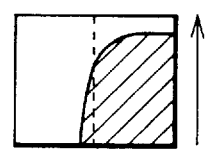
Figure 4D:
Figure 4E:
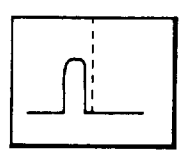

For example, suppose that the optical filter 51 is an optical low-pass filter having a transmission wavelength characteristic shown in FIG. 4C with respect to the main signal light wavelength. Then, when the state in which the input supervisory information signal is added at the longer wavelength side of the main signal light is represented by "1" (the main signal light is not transmitted), and the state in which it is added at the shorter wavelength side is represented by "0", the transmission wavelength spectrum will be as shown in FIG. 4D or FIG. 4E, respectively. The optical signal passed through the optical low-pass filter 51 is thus reduced to data representing the presence or absence of light, which is converted into electrical form by the light-receiving element, thus recovering the supervisory information signal.

Figure 5:
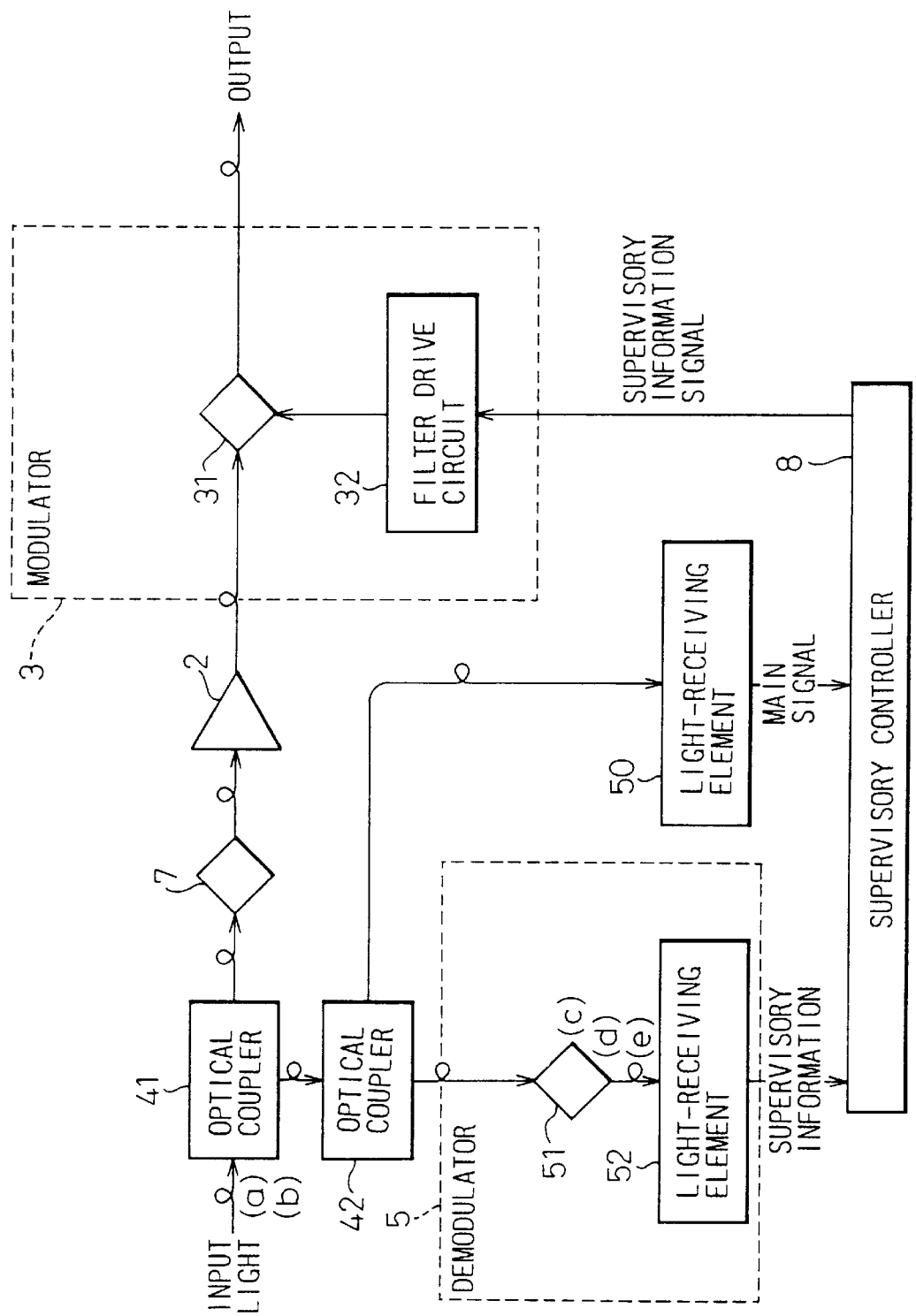
FIG. 5 is a diagram showing a first embodiment of an optical repeater used in the optical transmission system of the present invention.

FIG. 5 shows a first embodiment of an optical repeater used in the optical transmission system of the present invention. In the figure, the modulator 3 is identical to the one shown in FIG. 1, and likewise, the demodulator 5 is identical to the one shown in FIG. 3.

In this embodiment, optical couplers 41 and 42 are used instead of the optical coupler 4 shown in FIG. 3; the input signal power is split by the optical coupler 41 between two outputs, and one output light is fed into the optical coupler 42 where it is further split between two outputs, one directed to the demodulator 5 and the other to a light-receiving element 50. The other output light from the optical coupler 41 is fed to an optical band-pass filter 7 which transmits only the main signal wavelength, so that the main signal light is input to the modulator 3 via the optical amplifier 2. The supervisory information signal output from the demodulator 5 and the main signal output from the light-receiving element 50 are transferred to a supervisory controller 8 in the optical repeater, and the supervisory information signal (response signal) from the supervisory controller 8 is applied to the modulator 3.

The operation of the optical repeater of this embodiment will be described below with reference to the optical spectrum diagrams shown in FIGS. 4A to 4E.

The input signal light (FIG. 4A or 4B) is split by the optical coupler 41 which directs one signal light to the optical band-pass filter 7, where the spontaneous emission component added to the input main signal light wavelength and representing the supervisory information signal is removed and only the main signal light is transmitted. The main signal light consisting only of the main signal is amplified by the optical amplifier 2 with a gain sufficient to compensate for the transmission loss to the receiving terminal or to the next optical repeater. The amplified main signal light is passed through the modulator 3, and is sent out to the receiving terminal or optical repeater on the downstream side together with the supervisory information signal fed from the supervisory controller 8. The other signal light output from the optical coupler 41 is further split by the second optical coupler 42. To monitor the input light level, one output signal light from the optical coupler 42 is fed to the light-receiving element 50 for conversion into the main signal of electrical form which is supplied to the supervisory controller 8. The other output signal from the optical coupler 42 is fed into the demodulator 5 for demodulation into the supervisory information signal, as described in connection with the embodiment of FIG. 3, which is supplied to the supervisory controller 8. The supervisory controller 8 accepts the supervisory information signal, and depending on its contents, generates an information signal to be transmitted to the optical repeater or receiving terminal on the downstream side, or directly transfers the input supervisory information signal as the information signal to be transmitted downstream. The supervisory information signal is applied to the filter drive circuit 32 in the modulator 3 which converts the supervisory information signal into an optical form as described in connection with the embodiment of FIG. 1. The optical coupler 42 provided on the input side of the demodulator 5 to monitor the input light level need not necessarily be arranged as illustrated in this embodiment, but may be disposed between the input end of the optical repeater and the optical amplifier 2.

Figure 6:
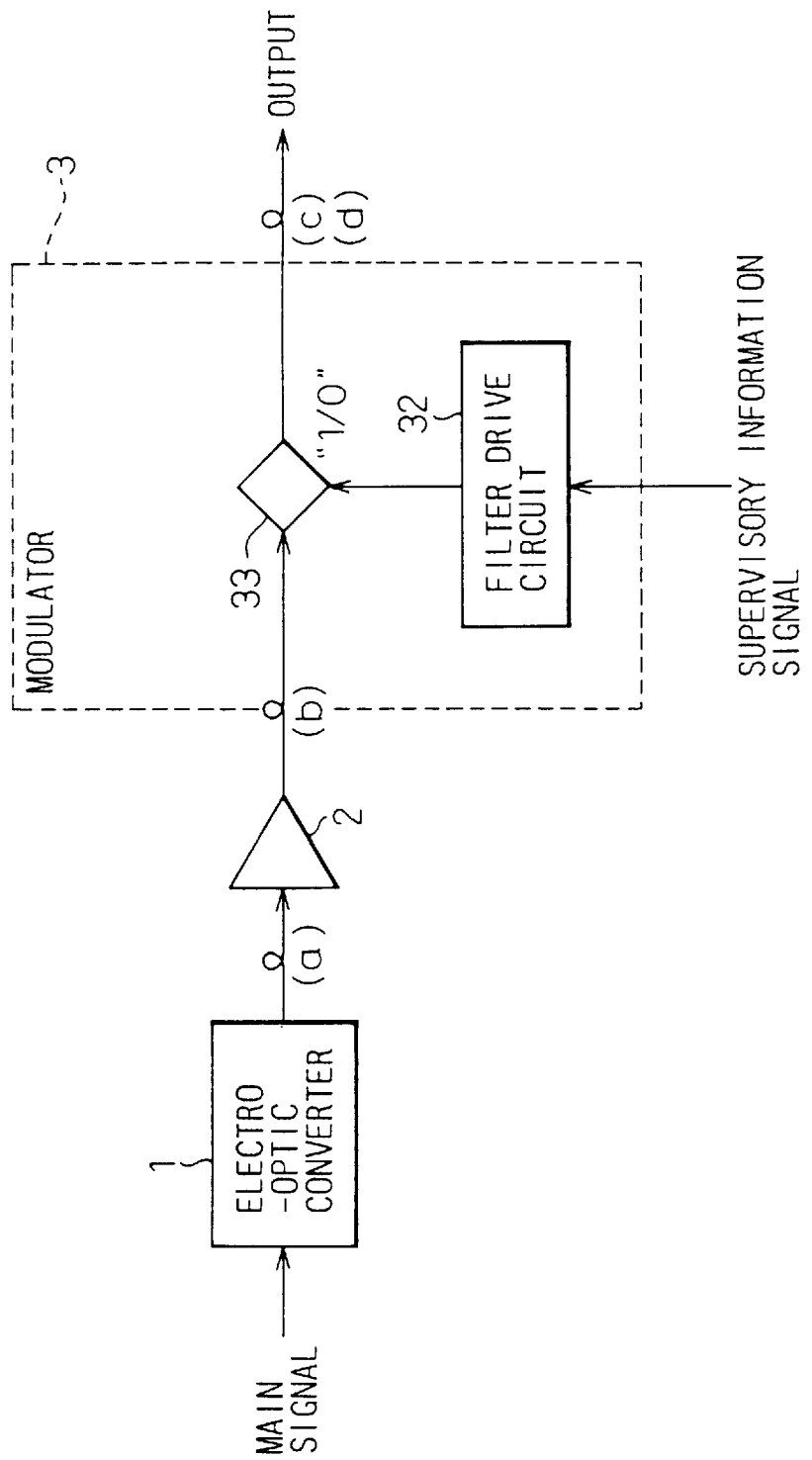
FIG. 6 and FIGS. 7A to 7D are diagrams showing a second embodiment of the transmitting terminal used in the optical transmission system of the present invention.
Figure 7A:
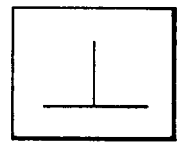
Figure 7B:
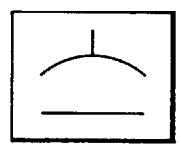
Figure 7C:
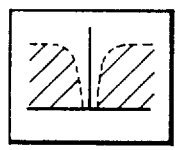
Figure 7D:
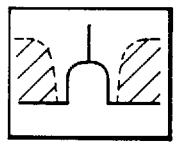

FIG. 6 shows a second embodiment of the transmitting terminal used in the optical transmission system of the present invention. This embodiment is different from the transmitting terminal shown in FIG. 1 only in the internal configuration of the modulator 3, that is, a variable-bandwidth optical band-pass filter 33 is used instead of the variable-wavelength optical band-pass filter 31 of FIG. 1.

More specifically, the variable-bandwidth optical band-pass filter 33 is capable of varying its pass band width in accordance with a control signal applied to it, and as shown in FIGS. 7A to 7D, the supervisory information signal is converted into an optical signal (FIG. 7C) consisting only of the main signal light wavelength or an optical signal (FIG. 7D) with the spontaneous emission component added at both the longer wavelength and shorter wavelength sides of the wavelength of the main signal light (FIG. 7A) fed from the electro-optic converter 1. The converted signal is transmitted downstream over a transmitting optical fiber.

In the system in which the supervisory information signal is transmitted from a transmitting terminal using the above variable-bandwidth optical band-pass filter, the same configuration as that of the receiving terminal of the embodiment shown in FIG. 3 can be used for the receiving terminal. Furthermore, the optical repeater for receiving and transmitting such a supervisory information signal can be implemented in the same configuration as that of the optical repeater shown in FIG. 5 except that the modulator 3 is replaced by the modulator 3 shown in FIG. 6.

FIG. 8 shows a third embodiment of the transmitting terminal used in the optical transmission system of the present invention. In this embodiment, a variable-wavelength, variable-bandwidth optical band-pass filter 34 is used which has functions of both of the variable-wavelength optical band-pass filter 31 shown in FIG. 1 and the variable-bandwidth optical band-pass filter 33 shown in FIG. 6.

Figure 9A:
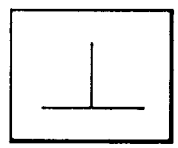
Figure 9B:
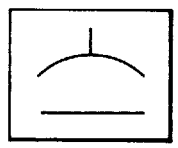
Figure 9C:
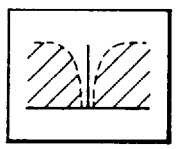
Figure 9D:
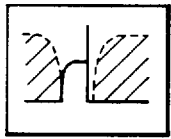
Figure 9E:
Figure 9F:
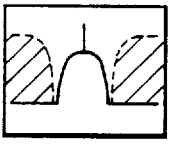

More specifically, as shown in FIGS. 9A to 9F, the modulator 3 converts the supervisory information signal into one of four output signal beams; that is, by the variable-wavelength optical band-pass filter 31 shown in FIG. 1, the wavelength is modulated as shown in FIGS. 9D and 9E, and by the variable-bandwidth optical band-pass filter 33 shown in FIG. 6, the bandwidth is modulated as shown in FIGS. 9C and 9F. In other words, optical signals with the spontaneous emission component added at one or other side of the main signal light wavelength (FIGS. 9D, 9E), an optical signal consisting only of the main signal light wavelength (FIG. 9C), and an optical signal with the spontaneous emission component added at both the shorter wavelength and longer wavelength sides (FIG. 9F) can be generated for transmission as the supervisory information signal.

For example, when the supervisory information signal is a digital signal represented by four values, "00", "01", "10", and "11", the optical signal consisting only of the main signal light wavelength can be represented by "00", the optical signal added at the longer wavelength side of the main signal light by "01", the optical signal added at the shorter wavelength side of the main signal light by "10", and the optical signal added at both sides of the main signal light by "11"; that is, the optical signals whose optical spectra are represented by these values can be transmitted as the supervisory information signal together with the main signal.

Figure 10:
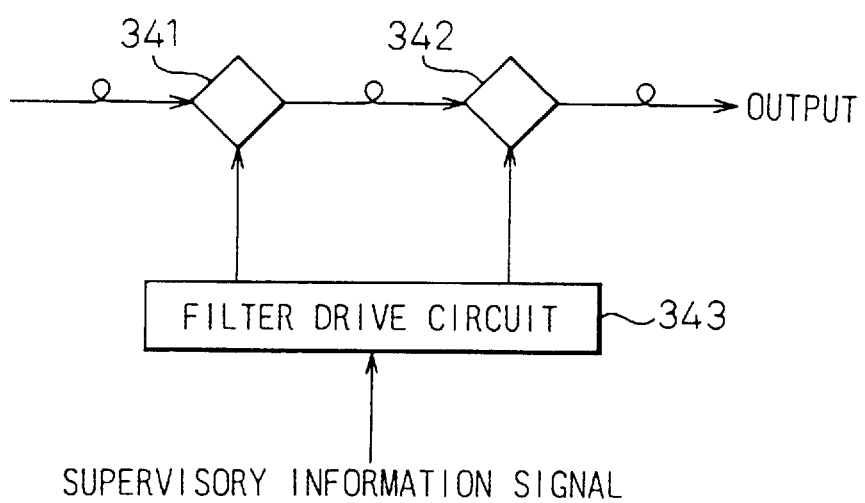
FIG. 10 is a diagram showing an embodiment of a wavelength-variable, bandwidth-variable modulator used in the optical transmission system of the present invention.

The optical filter 34 in the modulator 3 of the transmitting terminal can be implemented either by connecting the variable-wavelength optical band-pass filter of FIG. 1 to the variable-bandwidth optical band-pass filter of FIG. 6 in cascade or by connecting a variable optical high-pass filter 341 and a variable optical low-pass filter 342, each with a variable cut-off wavelength, in cascade as shown in FIG. 10.

FIG. 11 shows a second embodiment of the receiving terminal used in the optical transmission system of the present invention. This receiving terminal is so configured as to receive the supervisory information signal transmitted from the transmitting terminal shown in FIG. 8, and comprises an optical coupler 53, an optical low-pass filter 54 and optical high-pass filter 55 that respectively accept two output light beams from the optical coupler 53 and that transmit the low frequency components and high frequency components of the respective light beams, and a pair of light-receiving elements 52, 56 for converting the output light beams of the filters 54, 55 into electrical form.

In operation, the signal light input to the receiving terminal is split by the optical coupler 4 between two outputs, one being directed to the main signal receiver 6 and the other coupled to the demodulator 5. The signal light input to the demodulator 5 is split by the optical coupler 53: one light beam is fed into the optical low-pass filter 54 having the characteristic shown in FIG. 12M, which blocks the shorter wavelength components including the main signal light wavelength and transmits only the longer wavelength components to output the signal light shown in FIGS. 12E to 12H, and the other split light beam is fed into the optical high-pass filter 55 having the characteristic shown in FIG. 12N, which blocks the longer wavelength components including the main signal light wavelength and transmits only the shorter wavelength components to output the signal light shown in FIGS. 12I to 12L. The optical signals transmitted through the optical filters 54, 55 are converted by the respective light-receiving elements 52, 56 into electrical form, thus accomplishing the reception of the supervisory information signal.

For example, when the supervisory information signal is a digital signal represented by four values, "00", "01", "10", and "11", as in the example of FIG. 8, let the state in which no optical signals are input to the light-receiving elements 52, 56 be represented by "00", the state in which an optical signal is input only to the light-receiving element 52 connected to the optical filter 54 that transmits only the longer wavelength components be represented by "01", the state in which an optical signal is input only to the light-receiving element 56 connected to the optical filter 55 that transmits only the shorter wavelength components be represented by "10", and the state in which optical signals are input to both light-receiving elements 52, 56 be represented by "11"; then, the supervisory information signal transmitted encoded as one of the four values in the supervisory controller 8 can be recovered by demodulation.

FIG. 13 shows a second embodiment of the optical repeater used in the optical transmission system of the present invention. This optical repeater is configured to receive the supervisory information signal from the transmitting terminal shown in FIG. 8 and send it out for further transmission.

To achieve this, the optical repeater has a demodulator 5 that is identical in configuration to the demodulator 5 shown in FIG. 11, and a modulator 3 that is identical in configuration to the modulator 3 shown in FIG. 8. Further, the optical coupler 41 for monitoring the condition of the input light to the optical repeater and the optical coupler 42 connected to one output terminal of the optical coupler 41 may be replaced by a three-output optical coupler.

Figure 14:
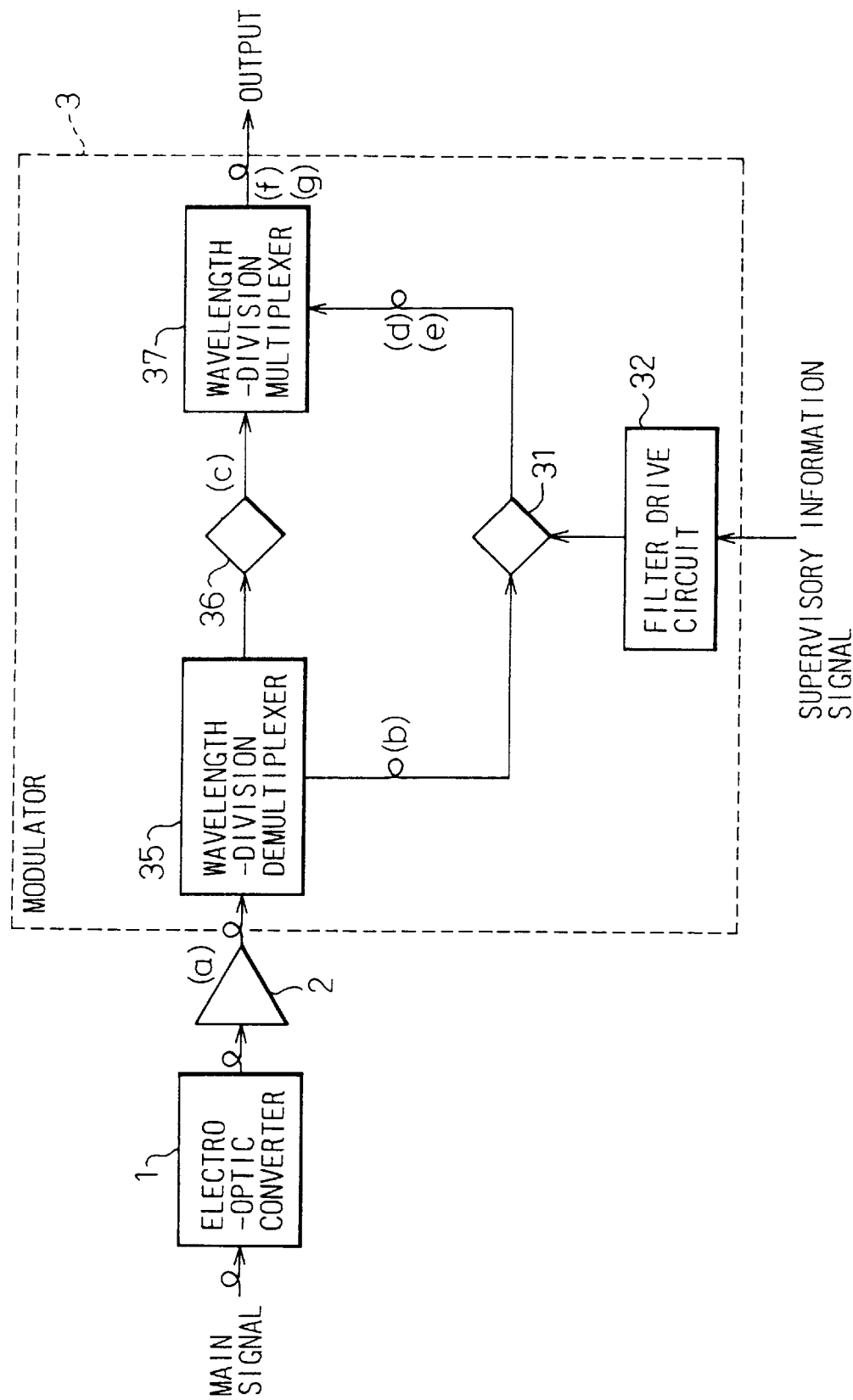

FIG. 14 shows a fourth embodiment of the transmitting terminal used in the optical transmission system of the present invention. The configuration of the modulator 3 of this embodiment differs significantly from that used in the transmitting terminals of the first to third embodiments.

More specifically, the difference is that, in FIG. 1, the output of the optical amplifier 2 is directly coupled to the variable-wavelength optical band-pass filter 31 in the modulator 3, whereas in the fourth embodiment, the output is first fed into an wavelength-division demultiplexer 35 which separates the component on the longer wavelength or shorter wavelength side of the main signal light from the other components of the input light, and then the separated component is fed as an input light beam (FIG. 15B) to the variable-wavelength optical band-pass filter 31, while the other signal light beam output from the wavelength-division demultiplexer 35 is fed to an optical band-pass filter 36 and on to a wavelength-division multiplexer 37 where the main signal light wavelength is multiplexed with the output light (FIG. 15D or 15E) of the variable-wavelength optical band-pass filter 31 to produce a multiplexed output light (FIG. 15F or 15G).

In operation, after the main signal is converted into optical form by the converter 1, the main signal light is amplified by the optical amplifier 2 with a, gain sufficient to compensate for the transmission loss to the next optical repeater. The amplified main signal light (FIG. 15A) is passed through the modulator 3 before it is output onto an optical fiber for transmission.

In the modulator 3, the wavelength-division demultiplexer 35 separates part of the spontaneous emission that occurred within the optical amplifier 3 (the illustrated example shows the longer wavelength component) from the optically amplified main signal light, and the separated spontaneous emission -component is fed into the variable-wavelength optical band-pass filter 31 where, as in the embodiment of FIG. 1, it is wavelength-modulated with the supervisory information signal into signal light (d) or (e) (FIG. 15D or 15E) in the spontaneous emission wavelength band at a different wavelength from the main signal wavelength. Then, in the wavelength-division multiplexer 37, the modulated signal light is multiplexed with the main signal light and the multiplexed signal light (f) or (g) (FIG. 15F or 15G) is output onto the optical fiber for transmission. Instead of the optical wavelength-division demultiplexer 35, an optical coupler having no wavelength selectivity may be used, but from the viewpoint of output light power, a wavelength-division demultiplexer having wavelength selectivity is preferable.

Figure 16:
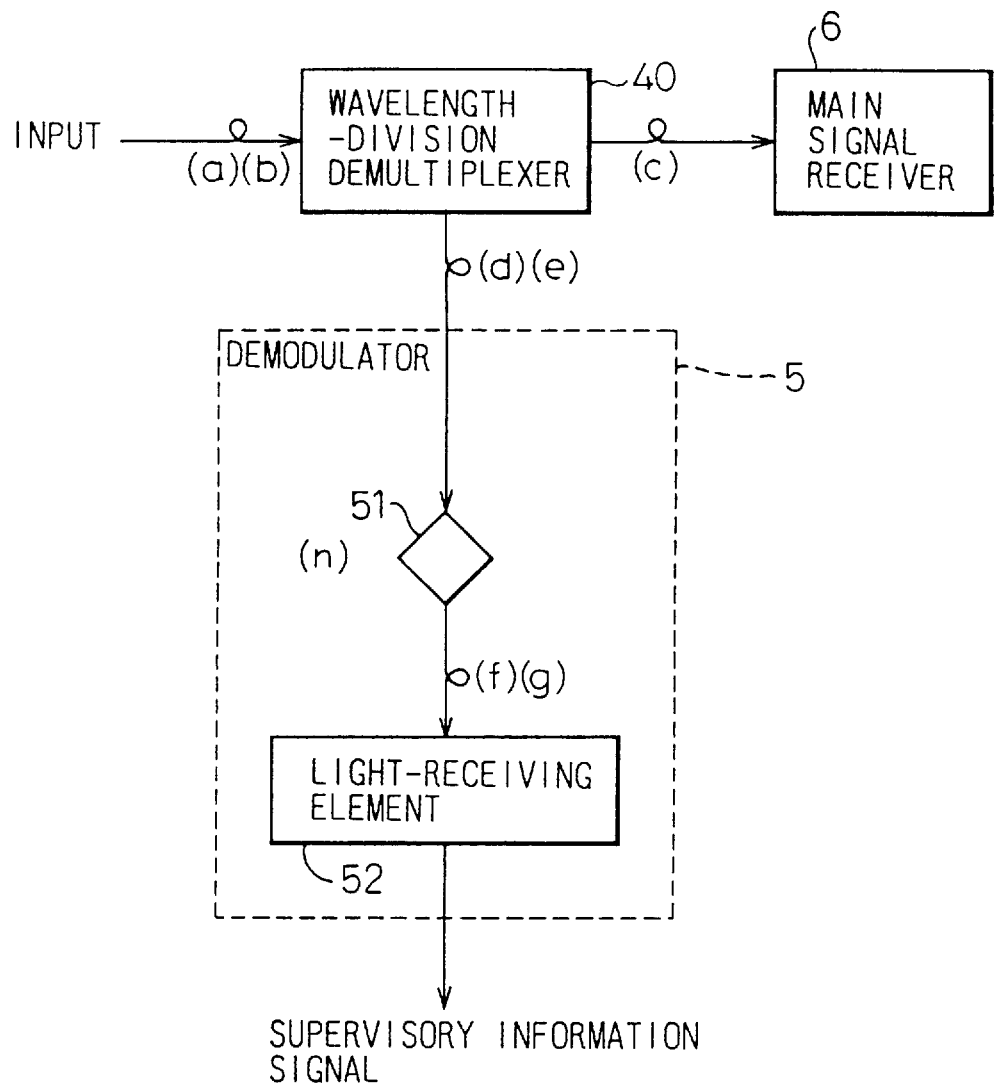
FIG. 16 and FIGS. 17A to 17H are diagrams showing a third embodiment of the receiving terminal used in the optical transmission system of the present invention.

FIG. 16 shows a third embodiment of the receiving terminal used in the optical transmission system of the present invention. This receiving terminal is configured to match the transmitting terminal shown in FIG. 14.

Figures 17A, 17B:
Figure 17C:
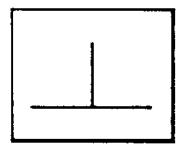
Figures 17D, 17E:
Figure 17H:
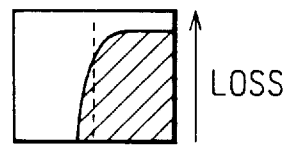
Figures 17F, 17G:
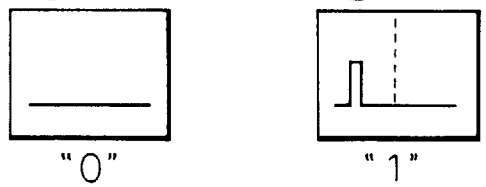

More specifically, in this embodiment, the input signal light (a) or (b) (FIG. 17A or 17B) is separated by a wavelength-division demultiplexer 40 into main signal light (c) (FIG. 17C) and supervisory information signal light (d) or (e) (FIG. 17D or 17E), and the separated main signal light (c) (FIG. 17C) is directed to the main signal receiver 6. On the other hand, the supervisory information signal light (d) or (e) (FIG. 17D or 17E) is fed into the demodulator 5 which demodulates the wavelength-modulated supervisory information signal. The demodulator 5 comprises an optical filter 51 and a light-receiving element 52. The supervisory information signal light (d) or (e) (FIG. 17D or 17E) is fed to the optical filter 51 having the filter characteristic shown in FIG. 17H so that only the component on the longer wavelength or shorter wavelength side of the center wavelength of the main signal light (c) (FIG. 17C) is transmitted through it (in the illustrated example, the longer wavelength component is transmitted). The transmitted optical signal (f) or (g) (FIG. 17F or 17G) is thus reduced to data only representing the presence ("1") or absence ("0") of light, which is converted by the light-receiving element 52 into electrical form, thus accomplishing the reception of the supervisory information signal. For the wavelength-division demultiplexer 40 also, an optical coupler may be used, but for the reason mentioned above, a wavelength-division demultiplexer is preferable.

Figure 18:
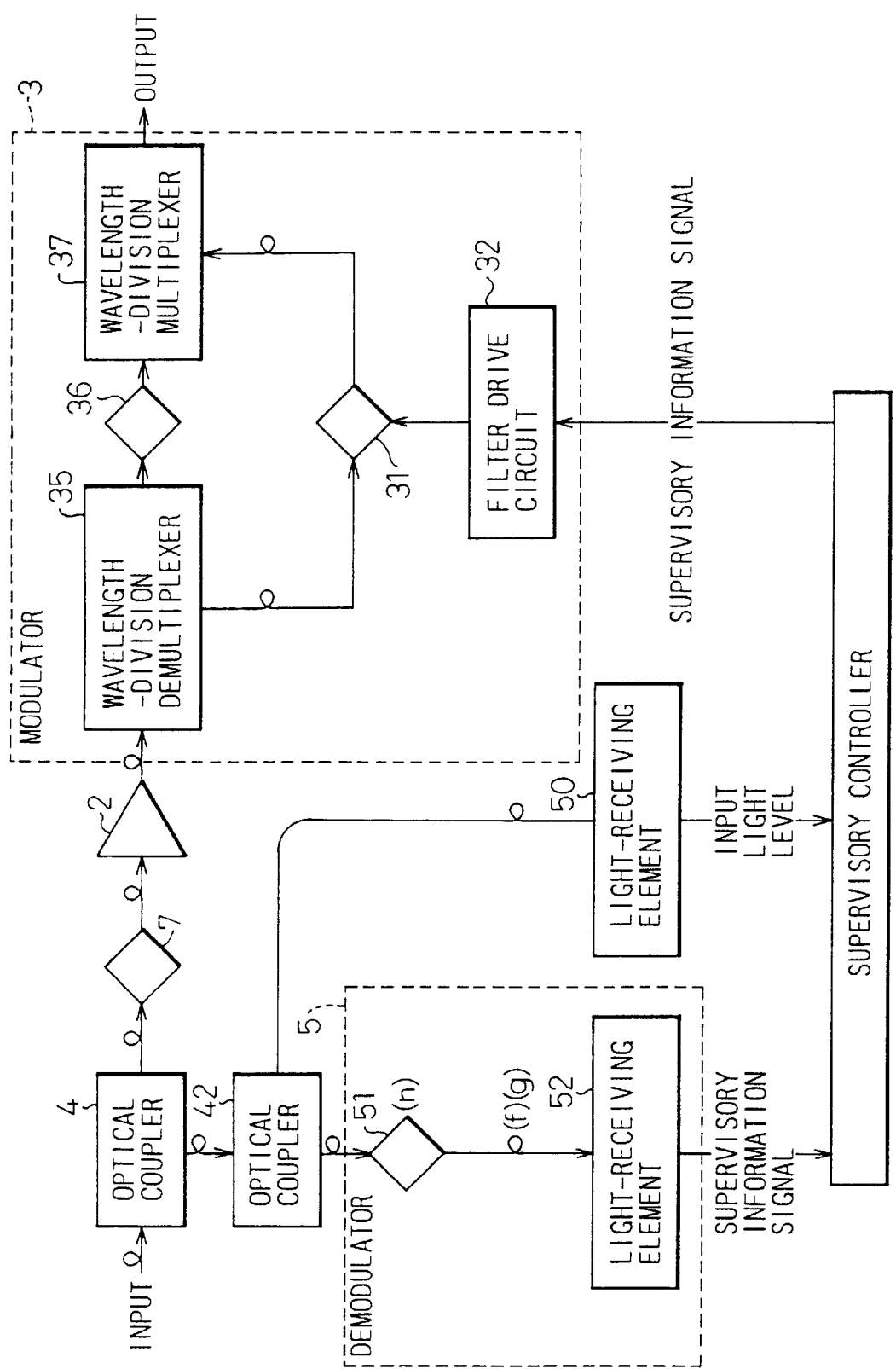
FIG. 18 is a diagram showing a third embodiment of the optical repeater used in the optical transmission system of the present invention.

FIG. 18 shows a third embodiment of the optical repeater used in the optical transmission system of the present invention. This optical repeater is specifically configured to receive the supervisory information signal transmitted from the transmitting terminal shown in FIG. 14 and send it out for further transmission. Accordingly, the demodulator 5 is identical in configuration to the demodulator 5 shown in FIG. 16, and the modulator 3 is identical in configuration to the modulator 3 shown in FIG. 14. Otherwise, the configuration of the optical repeater is the same as that of the optical repeaters shown in FIGS. 5 and 13.

More specifically, the signal light input to the optical repeater is fed into the optical coupler 4 which splits the light between two outputs, one being coupled to the optical band-pass filter 7 which transmits only the main signal wavelength and thus the main signal light. The main signal light consisting only of the main signal is amplified by the optical amplifier 2, with a gain sufficient to compensate for transmission loss, to the receiving terminal or the next optical repeater. The amplified main signal light is passed through the modulator 3, and is transmitted, along with the supervisory information signal from the supervisory controller 8, to the receiving terminal or optical repeater on the downstream side.

The other output is coupled to the wavelength-division demultiplexer 42 which demultiplexes it into main signal light and supervisory information signal light; the main signal light at one output is supplied to the light-receiving element 50 to monitor the input light level, and the supervisory information signal light at the other output is fed into the demodulator, which is identical in configuration to the one provided in the receiving terminal of FIG. 16, where the supervisory information signal is recovered, which is input to the supervisory controller 8.

The supervisory controller 8 accepts the supervisory information signal, and depending on its contents, generates an information signal to be transmitted to the optical repeater or receiving terminal on the downstream side, or directly transfers the input supervisory information signal as the information signal to be transmitted downstream. The information signal is applied to the filter drive circuit 32 in the modulator 3 which performs the same wavelength modulation as performed in the modulator 3 of FIG. 14.

Instead of placing the wavelength-division demultiplexer 42 between the optical coupler 4 and the optical filter 51, the wavelength-division demultiplexer may be inserted between the optical coupler 4 and the optical BPF 7.

Figure 19:
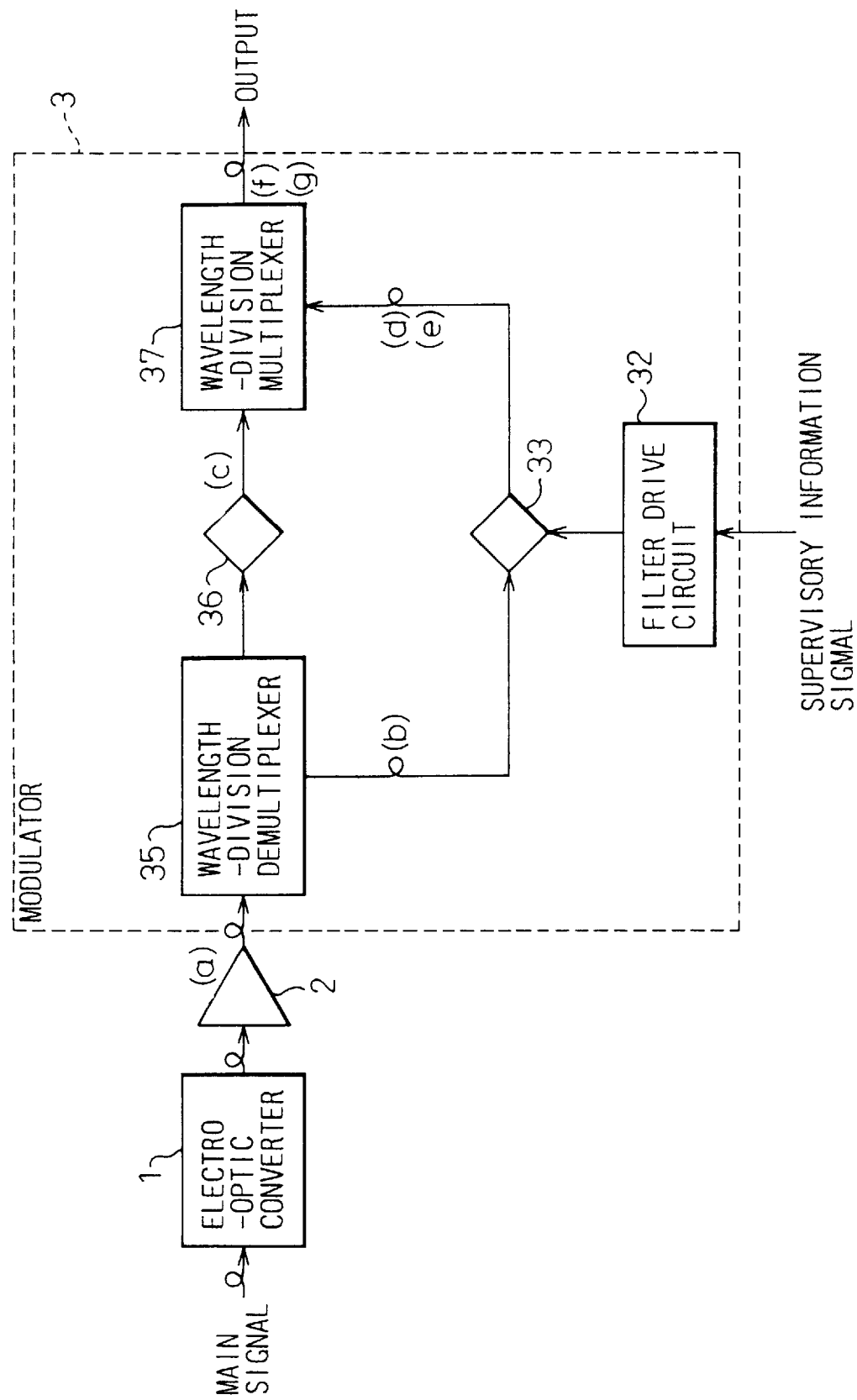

FIG. 19 shows a fifth embodiment of the transmitting terminal used in the optical transmission system of the present invention. This embodiment is different from the transmitting terminal shown in FIG. 14 in that the variable-wavelength optical band-pass filter 31 in the modulator 3 is replaced by a variable-bandwidth optical band-pass filter 33 capable of varying its transmission wavelength bandwidth. The modulation method for the supervisory information signal is the same as that performed by the filter 33 shown in FIG. 6.

In this configuration, as shown in the optical spectrum diagrams of FIGS. 20A to 20G, the supervisory information signal is converted into signal light (d) (FIG. 20D) having a narrow-band wavelength component or signal light (e) (FIG. 20E) having a wider-band wavelength component centered about a certain wavelength in the spontaneous emission wavelength band; the signal light is then multiplexed in the wavelength-division multiplexer 37 with the main signal light (c) (FIG. 20C) to produce multiplexed signal light (f) or (g) (FIG. 20F or 20G) for transmission downstream through a transmitting optical fiber.

Figure 21:
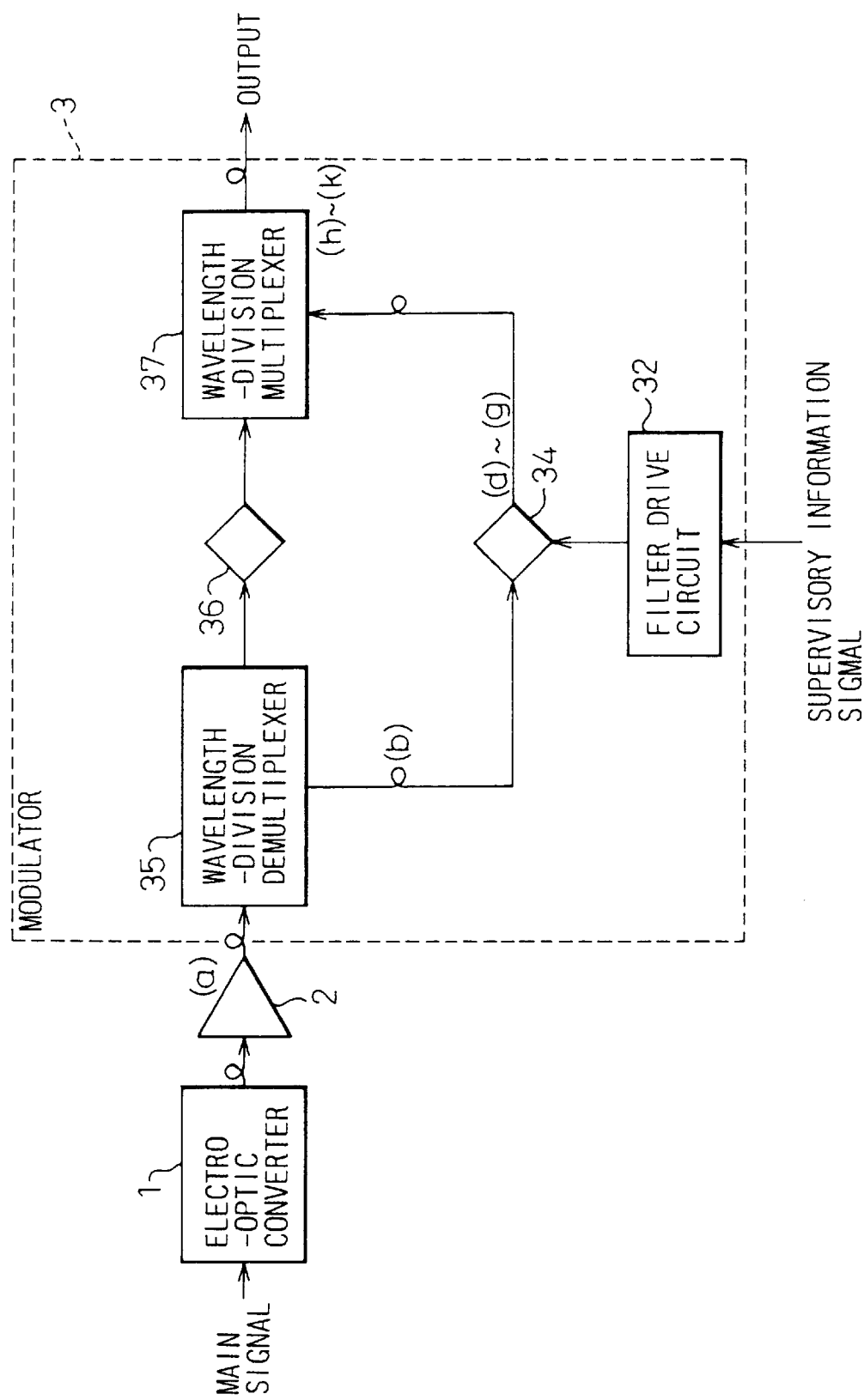

FIG. 21 shows a sixth embodiment of the transmitting terminal used in the optical transmission system of the present invention. This embodiment is different from the transmitting terminal shown in FIG. 14 in that the variable-wavelength optical band-pass filter 31 in the modulator 3 is replaced by a variable-wavelength, variable-bandwidth optical band-pass filter 34 that has, in addition to the variable-wavelength optical band-pass filter characteristic, a variable-bandwidth optical band-pass filter characteristic whereby the transmission bandwidth can be varied. The wavelength modulation method for the supervisory information signal is the same as that performed by the filter 34 shown in FIG. 8.

The light signals (d) to (g) (FIGS. 22D to 22G) output from the filter 34 are different from the modulated signals (c) to (f) (FIGS. 9C to 9F) shown in FIG. 8, because the output light (a) of the optical amplifier 2 is converted by the wavelength-division demultiplexer 35 into wavelength light (b) (FIG. 22B) that does not contain the main signal light wavelength, before it is fed to the filter 34.

FIG. 23 shows a fourth embodiment of the receiving terminal used in the optical transmission system of the present invention. The receiving terminal of this embodiment is configured to demodulate the supervisory information signal transmitted from the transmitting terminal shown in FIG. 21. The demodulator 5 in this embodiment operates in the same manner as the one provided in the receiving terminal shown in FIG. 11.

The signal light, (a)–(d) (FIG. 24A–24D), input to the receiving terminal is separated by the wavelength-division demultiplexer into main signal light and supervisory information signal light, and the main signal light (e) (FIG. 24E) is fed to the main signal receiver 6. The supervisory information signal light is coupled into the demodulator 5.

The signal light input to the demodulator 5 is separated by the wavelength-division demultiplexer or optical coupler 53 into two outputs: one output is coupled to the optical high-pass filter 55 having the characteristic (FIG. 24O) that blocks the longer wavelength component including the center wavelength of the supervisory information signal and transmits only the shorter wavelength component, and the other output is coupled to the optical low-pass filter 54 having the characteristic (FIG. 24N) that blocks the shorter wavelength component including the center wavelength and transmits only the longer wavelength component.

The optical signals (f)–(i) and (j)–(m) (FIG. 24F–24I and FIG. 24J–24M) transmitted through the optical filters 54 and 55 are converted to electrical signals by the respective light-receiving elements 52 and 56, whereby the supervisory information signal transmitted as one of four values is demodulated.

FIG. 25 shows a fourth embodiment of the optical repeater used in the optical transmission system of the present invention. The optical repeater of this embodiment also is configured to receive the supervisory information signal from the transmitting terminal shown in FIG. 21 and send it out for further transmission, and comprises a modulator 3 and a demodulator 5 which are identical in configuration to the corresponding components shown in FIGS. 21 and 23, respectively. It should, however, be noted that the optical coupler 4 is inserted between the wavelength-division demultiplexer 40 and the optical amplifier 2, and that one output light of the optical coupler 4 is converted by the light-receiving element 50 into an electrical signal to supply the input light level to the supervisory controller 8. Separation of various optical signal components at the input side of the optical repeater may also be accomplished by a configuration similar to that of the input side of FIG. 18.

Figure 26:
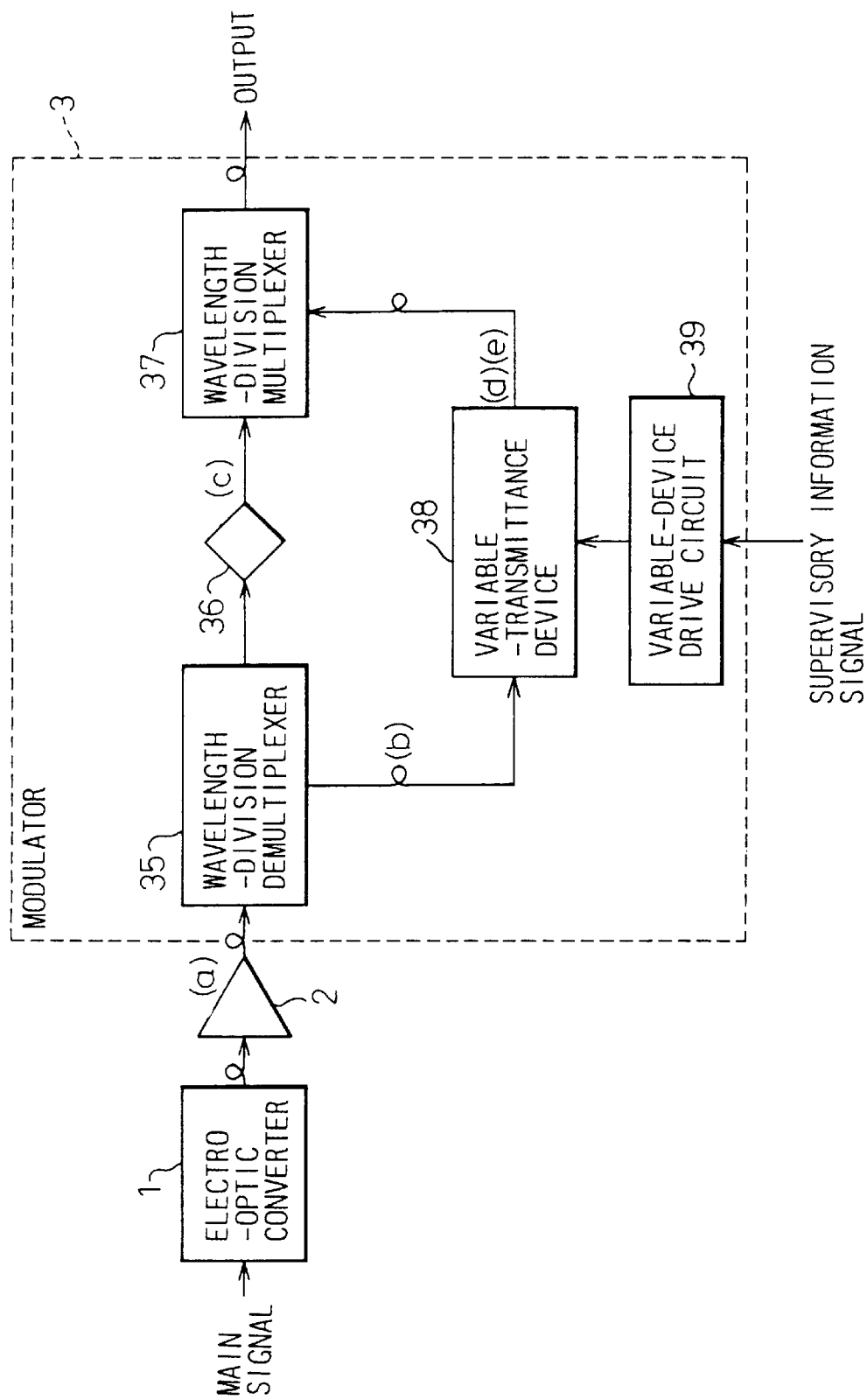

FIG. 26 shows a seventh embodiment of the transmitting terminal used in the optical transmission system of the present invention. In this embodiment, the variable-wavelength, variable-bandwidth optical band-pass filter 34 in the modulator 3 shown in FIGS. 21 and 25 is replaced by a variable-transmittance device 38.

More specifically, in the modulator 3 of this embodiment, the wavelength-division demultiplexer 35 separates part of the spontaneous emission that occurred within the optical amplifier 2 from the optically amplified main signal light, and the separated spontaneous emission component (b) (FIG. 27B) is passed through the variable-transmittance device 38 and emerges as signal light (d) or (e) (FIG. 27D or 27E); this signal light is then fed into the wavelength-division multiplexer 37 where it is multiplexed with the main signal light (c) (FIG. 27C) to produce signal light (f) or (g) (FIG. 27F or 27G) which is coupled into the transmission optical fiber.

The variable-transmittance device 38 has the capability of varying its light transmittance in accordance with the supervisory information signal externally applied to it via a variable-device drive circuit 39 (an implementation of such a device is a field absorption optical modulator), and performs amplitude modulation by varying its light transmittance in accordance with the supervisory information signal.

The variable-transmittance device 38 may also be implemented using an optical switch.

Figure 28:
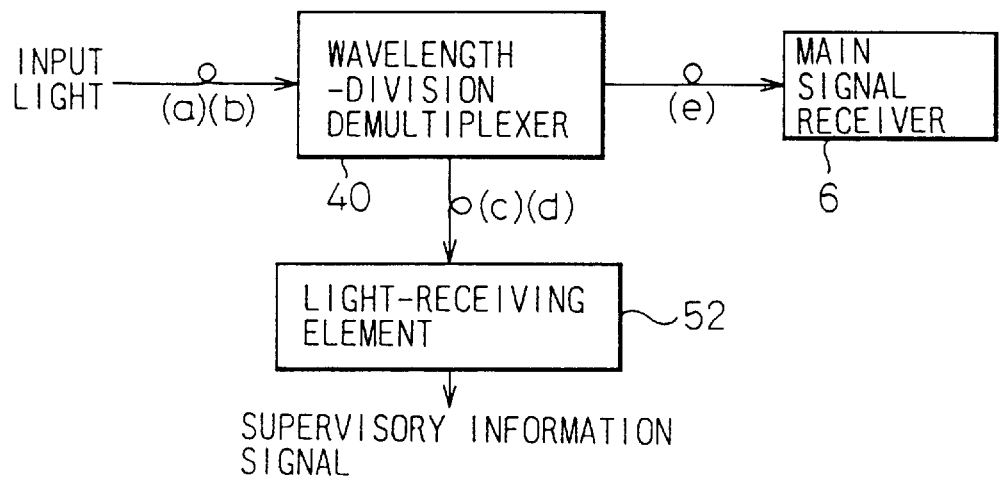
FIG. 28 and FIGS. 29A to 29E are diagrams showing a fifth embodiment of the receiving terminal used in the optical transmission system of the present invention.

FIG. 28 shows a fifth embodiment of the receiving terminal used in the optical transmission system of the present invention. The receiving terminal shown is specifically configured to receive the supervisory information signal transmitted from the transmitting terminal shown in FIG. 26.

Figures 29A, 29B:
Figures 29C, 29D:
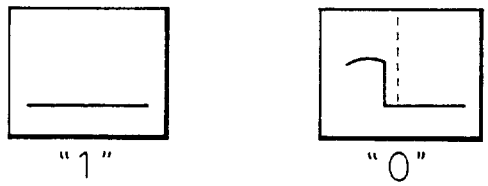
Figure 29E:

More specifically, the signal light (a) or (b) (FIG. 29A or 29B) input to the receiving terminal is separated by the wavelength-division demultiplexer 40 into main signal light (e) (FIG. 29E) and supervisory information signal light (c) or (d) (FIG. 29C or 29D) and the separated main signal light (e) (FIG. 29E) is fed to the main signal receiver 6 while the supervisory information signal light (c) or (d) (FIG. 29C or 29D) is converted into electrical form by the light-receiving element 52 acting as a demodulator, thus accomplishing the reception of the supervisory information signal.

An optical repeater for receiving the supervisory information signal from the transmitting terminal shown in FIG. 26 and for relaying the signal for further transmission can be implemented by incorporating the modulator 3 of FIG. 26 and the demodulator of FIG. 28 into the configuration shown in FIG. 25.

In the modulator (FIGS. 14, 18, 19, 21, 25, 26) designed to transmit the supervisory information signal at a different wavelength from the main signal wavelength, the optical band-pass filter 36 is inserted between the wavelength-division demultiplexer 35, which separates the main signal and the spontaneous emission component, and the wavelength-division multiplexer 37, for the purpose of removing the spontaneous emission component in the main signal light; if this is not necessary because of the transmission characteristics, the optical band-pass filter 36 may be omitted.

We claim:

1. An optical transmission apparatus comprising:

an optical amplifier for amplifying an input main optical signal and outputting a first optical signal containing an amplified main optical signal and spontaneously emitted light; and modulating means for modulating said spontaneously emitted light contained in said first optical signal in accordance with an auxiliary signal to output a second optical signal containing said amplified main optical signal and an auxiliary optical signal.

2. An optical transmission apparatus according to claim 1, wherein said modulating means includes:

a variable optical filter to which said first optical signal is input and whose transmission characteristic is varied in accordance with a drive signal to output said second optical signal; and a drive circuit for outputting said drive signal in accordance with said auxiliary signal.

3. An optical transmission apparatus according to claim 2, wherein said variable optical filter is a variable-wavelength optical band-pass filter whose center frequency is varied in accordance with said drive signal.

4. An optical transmission apparatus according to claim 2, wherein said variable optical filter is a variable-bandwidth optical band-pass filter whose pass band is varied in accordance with said drive signal.

5. An optical transmission apparatus according to claim 2, wherein said variable optical filter is a variable-wavelength, variable-bandwidth optical band-pass filter whose center frequency and pass band are both varied in accordance with said drive signal.

6. An optical transmission apparatus according to claim 5, wherein said variable-wavelength, variable-bandwidth optical band-pass filter includes a cascaded configuration consisting of a variable optical high-pass filter whose cut-off wavelength is varied in accordance with said drive signal, and a variable optical low-pass filter whose cut-off wavelength is varied in accordance with said drive signal.

7. An optical transmission apparatus according to claim 5, wherein said variable-wavelength, variable-bandwidth optical band-pass filter includes a cascaded configuration consisting of a variable-wavelength optical band-pass filter whose center frequency is varied in accordance with said drive signal, and a variable-bandwidth optical band-pass filter whose pass band is varied in accordance with said drive signal.

8. An optical transmission apparatus according to claim 1, wherein said modulating means includes:

a first optical branching device for separating said first optical signal into a third optical signal containing said amplified main signal and a fourth optical signal containing at least part of said spontaneously emitted light;

an optical modulator to which said fourth optical signal is input and whose transmission characteristic is varied in accordance with a drive signal, thereby modulating the spontaneously emitted light contained in said fourth optical signal;

a drive circuit for outputting said drive signal in accordance with said auxiliary signal; and a second optical branching device for coupling an output of said optical modulator and said third optical signal.

9. An optical transmission apparatus according to claim 8, wherein said first optical branching device is an optical wavelength-division demultiplexer for separating said first optical signal into said third optical signal containing said amplified main signal and said fourth optical signal not containing said amplified main signal.

10. An optical transmission apparatus according to claim 9, wherein said optical modulator is a variable-wavelength optical band-pass filter whose center frequency is varied in accordance with said drive signal.

11. An optical transmission apparatus according to claim 9, wherein said optical modulator is a variable-bandwidth optical band-pass filter whose pass band is varied in accordance with said drive signal.

12. An optical transmission apparatus according to claim 9, wherein said optical modulator is a variable-wavelength, variable-bandwidth optical band-pass filter whose center frequency and pass band are both varied in accordance with said drive signal.

13. An optical transmission apparatus according to claim 12, wherein said variable-wavelength, variable-bandwidth optical band-pass filter includes a cascaded configuration consisting of a variable optical high-pass filter whose cut-off wavelength is varied in accordance with said drive signal, and a variable optical low-pass filter whose cut-off wavelength is varied in accordance with said drive signal.

14. An optical transmission apparatus according to claim 12, wherein said variable-wavelength, variable-bandwidth optical band-pass filter includes a cascaded configuration consisting of a variable-wavelength optical band-pass filter whose center frequency is varied in accordance with said drive signal, and a variable-bandwidth optical band-pass filter whose pass band is varied in accordance with said drive signal.

15. An optical transmission apparatus according to claim 8, wherein said optical modulator includes a variable-transmittance device whose transmittance is varied in accordance with said drive signal.

* * * * *